United States Patent
Yacout et al.

(10) Patent No.: US 9,824,060 B2
(45) Date of Patent: Nov. 21, 2017

(54) TOOL AND METHOD FOR FAULT DETECTION OF DEVICES BY CONDITION BASED MAINTENANCE

(75) Inventors: Soumaya Yacout, Montreal (CA); David Salamanca, Ottawa (CA); Mohamad-Ali Mortada, Montreal (CA)

(73) Assignee: POLYVALOR, LIMITED PARTNERSHIP, Montreal (CA)

( * ) Notice: Subject to any disclaimer, the term of this patent is extended or adjusted under 35 U.S.C. 154(b) by 1262 days.

(21) Appl. No.: 13/811,819

(22) PCT Filed: Jul. 21, 2011

(86) PCT No.: PCT/CA2011/000876
§ 371 (c)(1),
(2), (4) Date: Feb. 4, 2013

(87) PCT Pub. No.: WO2012/009804
PCT Pub. Date: Jan. 26, 2012

(65) Prior Publication Data
US 2013/0132001 A1    May 23, 2013

Related U.S. Application Data

(60) Provisional application No. 61/367,069, filed on Jul. 23, 2010.

(51) Int. Cl.
*F02D 41/14*    (2006.01)
*G06F 15/18*    (2006.01)
(Continued)

(52) U.S. Cl.
CPC ............... *G06F 15/18* (2013.01); *G01D 3/10* (2013.01); *G01L 27/007* (2013.01); *G05B 23/024* (2013.01)

(58) Field of Classification Search
USPC ................... 123/425, 406.38; 700/80; 701/29
See application file for complete search history.

(56) References Cited

U.S. PATENT DOCUMENTS 5,201,292 A * 4/1993 Grajski ................... F02P 5/152
                                                    123/406.38
2002/0002414 A1   1/2002 Hsiung et al.
(Continued)

OTHER PUBLICATIONS

Yacout "Fault Detection and Diagnosis for Condition Based Maintenance Using the Logical Analysis of Data",2010 40th International Conference on Computers and Industrial Engineering (CIE), Jul. 25-28, 2010 (Jul. 28, 2010).
(Continued)

*Primary Examiner* — Lam Nguyen
(74) *Attorney, Agent, or Firm* — IP Delta Plus Inc.

(57) ABSTRACT

The present tool and method relate to device fault detection, diagnosis and prognosis. More particularly, the present tool and method store in a database a plurality of measured indicators representative of at least one dynamic condition of the device. The present tool and method further binarize by a processor the plurality of measured indicators, and analyze the plurality of binarized measured indicators using a machine learning data tool for extracting at least one pattern from the binarized measured indicators by adding at least one different constraint to each iteration. The at least one extracted pattern is indicative of whether the device has a fault or not.

7 Claims, 28 Drawing Sheets

(51) Int. Cl.
*G01D 3/10* (2006.01)
*G01L 27/00* (2006.01)
*G05B 23/02* (2006.01)

(56) References Cited

U.S. PATENT DOCUMENTS

| | | |
|---|---|---|
| 2004/0024773 A1 | 2/2004 | Stoffel et al. |
| 2007/0177787 A1 | 8/2007 | Maeda et al. |
| 2008/0243328 A1 | 10/2008 | Yu et al. |

OTHER PUBLICATIONS

Boros et al. "An Implementation of Logical Analysis of Data", IEEE Transactions on Knowledge and Data Engineering, vol. 12, No. 2, pp. 292-306, Mar./Apr. 2000 (Apr. 2000).

* cited by examiner

| # OBS. | CLAS | AGE | | MANUFACTURER | FAILURE MODE | THRESHOLD |
|---|---|---|---|---|---|---|
| | | $b_1$ | $b_2$ | $b_3$ | $b_4$ | $b_5$ |
| 1 | + | 0 | 0 | 0 | 0 | 0 |
| 2 | - | 0 | 0 | 0 | 0 | 1 |
| 3 | + | 0 | 0 | 0 | 1 | 0 |
| 4 | - | 0 | 0 | 0 | 1 | 1 |
| 5 | + | 0 | 0 | 1 | 0 | 0 |
| 6 | - | 0 | 0 | 1 | 0 | 1 |
| 7 | + | 0 | 0 | 1 | 1 | 0 |
| 8 | - | 0 | 0 | 1 | 1 | 1 |
| 9 | + | 0 | 1 | 0 | 0 | 0 |
| 10 | - | 0 | 1 | 0 | 0 | 1 |
| 11 | + | 0 | 1 | 0 | 1 | 0 |
| 12 | - | 0 | 1 | 0 | 1 | 1 |
| 13 | + | 0 | 1 | 1 | 0 | 0 |
| 14 | - | 0 | 1 | 1 | 0 | 1 |
| 15 | + | 0 | 1 | 1 | 1 | 0 |
| 16 | + | 0 | 1 | 1 | 1 | 1 |
| 17 | + | 1 | 1 | 0 | 0 | 0 |
| 18 | + | 1 | 1 | 0 | 0 | 1 |
| 19 | + | 1 | 1 | 0 | 1 | 0 |
| 20 | - | 1 | 1 | 0 | 1 | 1 |
| 21 | - | 1 | 1 | 1 | 0 | 1 |
| 22 | - | 1 | 1 | 1 | 0 | 1 |
| 23 | + | 1 | 1 | 1 | 1 | 0 |
| 24 | + | 1 | 1 | 1 | 1 | 1 |

FIG. 3

| 3 | 9 920 |
| 4 | 87 440 |
| 5 | 583 568 |
| 6 | 3 064 208 |
| 7 | 12 986 768 |
| 8 | 45 235 088 |
| 9 | 131 230 608 |
| 10 | 320 420 752 |

FIG. 4

| PATTERN NAME | TERM | COVERED OBSERVATIONS | # OF COVERED OBSERVATIONS |
|---|---|---|---|
| $P_1$ | $b_4$ | 7,11,15,24 | 4 |
| $P_2$ | $\bar{b}_5$ | 1,5,9,13,15,7,11 | 8 |
| $P_3$ | $b_1\bar{b}_3$ | 18 | 1 |
| $P_4$ | $\bar{b}_2 b_3$ | 5,7 | 2 |
| $P_5$ | $b_2\bar{b}_3$ | 9,18,11 | 3 |
| $N_1$ | $\bar{b}_1 b_5$ | 2,14 | 2 |
| $N_2$ | $\bar{b}_2 b_5$ | 2 | 1 |
| $N_3$ | $b_3\bar{b}_4 b_5$ | 14,22 | 2 |

FIG. 5

| OBSERVATION # | VALUE OF THE NORMALIZED DISCRIMINANT FUNCTION | THE RESULTING CLASSIFICATION BASED ON FIG. 1 | THE RESULTING CLASSIFICATION BASED ON LOGICAL RULE | THE ACTUAL STATE |
|---|---|---|---|---|
| 3 | 0.67 | + | + | + |
| 4 | -0.38 | - | - | - |
| 6 | -0.89 | - | - | + |
| 8 | -0.27 | + | - | - |
| 10 | -0.23 | + | - | - |
| 12 | -0.01 | + | - | - |
| 16 | -0.18 | + | - | + |
| 17 | 0.67 | + | + | + |
| 19 | 0.89 | + | + | + |
| 20 | 0.44 | + | + | - |
| 23 | 0.67 | + | + | + |

FIG. 6

| STATES | MAXIMAL DEGREE ALLOWED FOR PATTERN GENERATION | NUMBER OF PATTERNS GENERATED | | RUNNING TIME |
|---|---|---|---|---|
| | | POSITIVE | NEGATIVE | |
| HIGH ENERGY AND NORMAL | 3 | 397 | 216 | 18 MINUTES ET 40 SECONDS |
| | 4 | 468 | 408 | 35 MINUTES ET 25 SECONDS |
| LOW ENERGY AND NORMAL | 3 | 239 | 172 | 14 MINUTES ET 32 SECONDS |
| | 4 | 264 | 201 | 22 MINUTES ET 6 SECONDS |
| THERMAL HEATING AND NORMAL | 3 | 91 | 110 | 3 MINUTES ET 10 SECONDS |
| | 4 | 113 | 119 | 5 MINUTES ET 50 SECONDS |

FIG. 7

| #OBS. | VALUE OF THE DISCRIMINANT FUNCTION | ACTUAL STATE |
|---|---|---|
| 1 | 0.668968 | + |
| 2 | 0.668968 | + |
| 3 | -0.758184 | - |
| 4 | 0.112772 | - |
| 5 | 0.614056 | - |
| 6 | -0.473631 | - |

FIG. 8

| #OBS. | VALUE OF THE DISCRIMINANT FUNCTION | ACTUAL STATE |
|---|---|---|
| 1 | 0.671545 | + |
| 2 | 0.627642 | + |
| 3 | 0.362221 | + |
| 4 | 0.425915 | + |
| 5 | 0.543089 | + |
| 6 | 0.627642 | + |
| 7 | -0.695565 | - |
| 8 | -0.41525 | - |
| 9 | -0.465778 | - |
| 10 | -0.396197 | - |

FIG. 9

| #OBS. | VALUE OF THE DISCRIMINANT FUNCTION | ACTUAL STATE |
|---|---|---|
| 1 | 0.679663 | + |
| 2 | 0.268104 | + |
| 3 | 0.839483 | + |
| 4 | -0.00417577 | + |
| 5 | 0.307196 | + |
| 6 | 0.26557 | + |
| 7 | 0.690959 | + |
| 8 | 0.690959 | + |
| 9 | -0.332265 | - |
| 10 | 0.839483 | + |
| 11 | -0.458796 | + |
| 12 | -0.427404 | + |
| 13 | 0.797858 | + |
| 14 | -0.457143 | - |
| 15 | -0.583673 | - |
| 16 | -0.497184 | - |
| 17 | -0.552282 | - |

FIG. 10

| PROCESSING SCHEME | NUMERICAL ATTRIBUTES |
|---|---|
| DORNENBURG RATIOS | $\gamma_1 = \dfrac{CH_4}{H_2}$ ; $\gamma_2 = \dfrac{C_2H_2}{C_2H_4}$ ; $\gamma_3 = \dfrac{C_2H_6}{C_2H_2}$ ; $\gamma_4 = \dfrac{C_2H_2}{CH_4}$ |
| ROGERS RATIOS [36] | $\gamma_1 = \dfrac{C_2H_2}{C_2H_4}$ ; $\gamma_2 = \dfrac{CH_4}{H_2}$ ; $\gamma_3 = \dfrac{C_2H_4}{C_2H_6}$ |
| COMBINED RATIOS (DORNENBURG & ROGERS) | $\gamma_1 = \dfrac{CH_4}{H_2}$ ; $\gamma_2 = \dfrac{C_2H_2}{C_2H_4}$ ; $\gamma_3 = \dfrac{C_2H_6}{C_2H_2}$ ; $\gamma_4 = \dfrac{C_2H_2}{CH_4}$ ; $\gamma_5 = \dfrac{C_2H_4}{C_2H_4}$ |
| ABSOLUTE CONTENT METHOD [6] | $\gamma_1 = \dfrac{H_2}{\max_{1=1}(y_1)}$ ; $\gamma_2 = \dfrac{CH_4}{\max_{1=2}(y_1)}$ ; $\gamma_3 = \dfrac{C_2H_6}{\max_{1=2}(y_1)}$ ; $\gamma_4 = \dfrac{C_2H_4}{\max_{1=1}(c_1)}$ ; $\gamma_5 = \dfrac{C_2H_2}{\max_{1=1}(c_1)}$ ; $\gamma_6 = \log_{10}(\max_{1=1}(c_1))$ |

FIG. 14

|  | DIAGNOSIS ACCURACY % | | | |
|---|---|---|---|---|
|  | DORNENBURG RATIO DATA | ROGERS RATIO DATA | COMBINED RATIOS DATA | ABSOLUTE CONTENT DATA |
| $l = 1$ | 60% | 66.67% | 60% | 43.33% |
| $l = 5$ | 70% | 73.33% | 66.67% | 53.33% |
| $l = 10$ | 76.67% | 73.33% | 66.67% | 53.33% |
| $l = 20$ | 76.67% | 73.33% | 73.33% | 53.33% |

|  | DORNENBURG RATIO DATA | ROGERS RATIO DATA | COMBINED RATIOS DATA | ABSOLUTE CONTENT DATA |
|---|---|---|---|---|
| PD | 3/3 | 3/3 | 3/3 | 3/3 |
| D1 | 8/9 | 7/9 | 7/9 | 2/9 |
| D2 | 8/10 | 8/10 | 8/10 | 3/10 |
| T1/T2 | 3/4 | 3/4 | 3/4 | 1/4 |
| T3 | 1/4 | 1/4 | 1/4 | 3/4 |

|       | DIAGNOSIS ACCURACY %    |                     |                        |                         |
|-------|-------------------------|---------------------|------------------------|-------------------------|
|       | DORNENBURG RATIO DATA   | ROGERS RATIO DATA   | COMBINED RATIOS DATA   | ABSOLUTE CONTENT DATA   |
| $l=1$   | 76%                     | 72%                 | 72%                    | 80%                     |
| $l=5$   | 76%                     | 80%                 | 76%                    | 80%                     |
| $l=10$  | 76%                     | 80%                 | 76%                    | 92%                 |
| $l=20$  | 80%                     | 80%                 | 76%                    | 92%                 |

| METHOD           | ANN | ES     | FL | ANNES | SVM | LAD |
|------------------|-----|--------|----|-------|-----|-----|
| TRAINING TIME (S)| 81  | ABSENT | 82 | 44    | <1  | <1  |

| LITERAL | PATTERN #1 | | VALUE |
|---|---|---|---|
| | ATTRIBUTE NUMBER | CUT-POINT NUMBER | |
| 1 | 2 | 15 | <0.85 |
| 2 | 4 | 3 | <0.69 |
| 3 | 4 | 4 | <0.86 |
| 4 | 4 | 5 | <0.93 |
| 5 | 6 | 16 | <3.35 |
| PATTERN #2 | | | |
| LITERAL | ATTRIBUTE NUMBER | CUT-POINT NUMBER | VALUE |
| 1 | 5 | 4 | >0.16 |

FIG. 23

| ROGERS RATIO METHOD | | | |
|---|---|---|---|
| FAULT TYPE | $CH_4/H_2$ | $C_2H_2/C_2H_4$ | $C_2H_4/C_2H_6$ |
| NO FAULT | 0.1-1.0 | <0.1 | <1.0 |
| PD | <0.1 | <0.1 | <1.0 |
| D1/D2 | 0.1-1.0 | 0.1-3.0 | >3.0 |
| T1 | 0.1-1.0 | <0.1 | 1.0-3.0 |
| T2 | >1.0 | <0.1 | 1.0-3.0 |
| T3 | >1.0 | <0.1 | >3.0 |

FIG. 24

| FAULT TYPE | $CH_4/H_2$ | $C_2H_2/C_2H_4$ | $C_2H_4/C_2H_6$ |
|---|---|---|---|
| THERMAL | >0.375 | <1.049 | - |
| THERMAL | >0.635 | <1.049 | - |
| THERMAL | <0.635 | 0.005-1.048 | <12.78 |
| THERMAL | <0.635 | 0.005-0.140 | - |
| THERMAL | <0.635 | >0.0144 | <0.045 |
| NON-THERMAL | <0.375 | - | >0.045 |
| NON-THERMAL | <0.375 | >0.005 | >0.045 |
| NON-THERMAL | <0.635 | >0.005 | >0.078 |
| NON-THERMAL | 0.003-0.635 | >0.005 | - |
| NON-THERMAL | >0.578 | >1.048 | - |

FIG. 25

| FAULT TYPE | CH4/H2 | C2H2/C2H4 | C2H4/C2H6 |
|---|---|---|---|
| PD | - | - | <0.55 |
| PD | - | >0.009 | <0.55 |
| PD | >2.077 | >0.106 | <0.131 |
| PD | >5008.77 | >0.106 | >0.55 |
| PD | <0.273 | - | - |
| ENERGY DISCHARGE | <5008.77 | - | >0.55 |
| ENERGY DISCHARGE | >0.273 | >0.132 | - |
| ENERGY DISCHARGE | 0.273-5008.77 | <0.132 | >0.55 |
| ENERGY DISCHARGE | 1.2062-5008.77 | - | - |
| ENERGY DISCHARGE | >0.273 | >0.009 | >0.55 |

FIG. 26

| FAULT TYPE | CH4/H2 | C2H2/C2H4 | C2H4/C2H6 |
|---|---|---|---|
| D1 | >0.970 | <0.565 | - |
| D1 | >2.32 | - | - |
| D1 | >2.32 | <0.565 |  |
| D1 | >2.32 | <0.565 | >1.59 |
| D1 | >0.970 | - | <1.59 |
| D2 | <2.32 | >1.59 | <13.21 |
| D2 | <2.32 | >0.041 | 2.814-5199 |
| D2 | <2.32 | - | 2.814-26.41 |
| D2 | - | >0.185 | 13.8-5199 |
| D2 | <1.862 | <0.317 | >1.59 |

FIG. 27

| FAULT TYPE | CH4/H2 | C2H2/C2H4 | C2H4/C2H6 |
|---|---|---|---|
| T1/T2 | - | <255.52 | <3.85 |
| T1/T2 | <0.196 | <255.52 | <3.85 |
| T1/T2 | 0.009-0.011 | <0.397 | >7.62 |
| T1/T2 | 0.009-0.011 | <0.11 | >7.62 |
| T1/T2 | >0.407 | >1.47 | - |
| T3 | - | >0.11 | >3.851 |
| T3 | >0.002 | >0.11 | >3.85 |
| T3 | 0.002-0.003 | - | - |
| T3 | 0.002-0.003 | >255.521 | - |
| T3 | >0.006 | 0.11-10.35 | >3.85 |

FIG. 28

| TESTING CLASSES | CLASSIFICATION OF TESTS | | |
|---|---|---|---|
| | POSITIVE | NEGATIVE | UNCLASSIFIED |
| POSITIVE | A | C (TYPE II ERROR) | E |
| NEGATIVE | B (TYPE I ERROR) | D | F |

FIG. 29

| TESTING CLASSES | CLASSIFICATION OF TESTS | | |
|---|---|---|---|
| | POSITIVE | NEGATIVE | UNCLASSIFIED |
| POSITIVE | A | C (TYPE II ERROR) | E |
| NEGATIVE | B (TYPE I ERROR) | D | F |

FIG. 30

| BEARING 3 DATA SETS |||||
|---|---|---|---|---|
| DATA SET NUMBER | TRAINING SET SIZE || TESTING SET SIZE ||
| 1 | 25 | 21 NORMAL 4 FAULTY | 2131 | 1713 NORMAL 418 FAULTY |
| 2 | 28 | 23 NORMAL 5 FAULTY | 2128 | 1711 NORMAL 417 FAULTY |
| 3 | 35 | 28 NORMAL 5 FAULTY | 2121 | 1706 NORMAL 415 FAULTY |
| 4 | 43 | 34 NORMAL 9 FAULTY | 2113 | 1700 NORMAL 413 FAULTY |
| 5 | 53 | 43 NORMAL 10 FAULTY | 2103 | 1691 NORMAL 412 FAULTY |

FIG. 31

| BEARING 4 DATA SETS |||||
|---|---|---|---|---|
| DATA SET NUMBER | TRAINING SET SIZE || TESTING SET SIZE ||
| 1 | 30 | 20 NORMAL 10 FAULTY | 2126 | 1447 NORMAL 679 FAULTY |
| 2 | 34 | 23 NORMAL 11 FAULTY | 2122 | 1444 NORMAL 678 FAULTY |
| 3 | 39 | 27 NORMAL 12 FAULTY | 2117 | 1440 NORMAL 677 FAULTY |
| 4 | 47 | 32 NORMAL 15 FAULTY | 2109 | 1435 NORMAL 674 FAULTY |
| 5 | 53 | 36 NORMAL 17 FAULTY | 2103 | 1431 NORMAL 672 FAULTY |

FIG. 32

| RESULTS (BEARING 3)-DATA SET 1 | | | | | | | | | | | | |
| --- | --- | --- | --- | --- | --- | --- | --- | --- | --- | --- | --- | --- |
| K FACTOR | 1 | 10 | 25 | 50 | 75 | 100 | 1 | 10 | 25 | 50 | 75 | 100 |
| FEATURE SET TYPE | ALL FEATURES | | | | | | WAVELET FEATURES ONLY | | | | | |
| BINARY ATTRIBUTES | 76 | | | | | | 54 | | | | | |
| TRAINING TIME (S) | <1 | <1 | 1 | 3 | 6 | 8 | <1 | <1 | 1 | 3 | 5 | 8 |
| NORMAL PATTERNS | 1 | 16 | 46 | 96 | 146 | 196 | 1 | 19 | 45 | 79 | 129 | 177 |
| DEFECTIVE PATTERNS | 1 | 10 | 25 | 50 | 75 | 100 | 1 | 10 | 40 | 90 | 140 | 190 |
| ACCURACY (%) | 81.2 | 91.2 | 92.1 | 93.2 | 93.6 | 93.6 | 97.1 | 94.3 | 92.3 | 91.7 | 90.9 | 90.3 |
| TRUE NEGATIVE (%) | 86.7 | 98.7 | 99.1 | 99.1 | 99.4 | 99.1 | 97.1 | 97.1 | 99.1 | 99.0 | 99.0 | 99.4 |
| TRUE POSITIVE (%) | 58.6 | 60.5 | 63.4 | 68.9 | 70.1 | 71.1 | 94.5 | 83.0 | 64.4 | 61.7 | 57.7 | 52.9 |
| FALSE NEGATIVE (%) | 4.8 | 39.2 | 36.6 | 31.1 | 29.9 | 29.0 | 5.5 | 17.0 | 35.7 | 38.3 | 42.3 | 47.1 |
| FALSE POSITIVE (%) | 0.4 | 1.3 | 0.9 | 0.9 | 0.6 | 0.9 | 2.3 | 2.9 | 0.9 | 1.1 | 1.0 | 0.6 |
| CLASSIFICATION QUALITY | 97.4 | 79.7 | 81.3 | 84.0 | 84.7 | 85.1 | 96.1 | 90.1 | 81.7 | 80.3 | 78.3 | 76.1 |

FIG. 33

| RESULTS (BEARING 3)-TRAINING SET 2 | | | | | | | | | | | | |
| --- | --- | --- | --- | --- | --- | --- | --- | --- | --- | --- | --- | --- |
| K FACTOR | 1 | 10 | 25 | 50 | 75 | 100 | 1 | 10 | 25 | 50 | 75 | 100 |
| FEATURE SET TYPE | ALL FEATURES | | | | | | WAVELET FEATURES ONLY | | | | | |
| BINARY ATTRIBUTES | 114 | | | | | | 88 | | | | | |
| TRAINING TIME (S) | <1 | <1 | 1 | 5 | 8 | 11 | <1 | <1 | 1 | 5 | 11 | 17 |
| NORMAL PATTERNS | 1 | 17 | 47 | 90 | 115 | 146 | 1 | 15 | 40 | 78 | 118 | 170 |
| DEFECTIVE PATTERNS | 1 | 10 | 25 | 50 | 75 | 100 | 1 | 10 | 25 | 67 | 117 | 167 |
| ACCURACY (%) | 76.8 | 93.0 | 95.3 | 94.8 | 94.0 | 93.7 | 90.7 | 95.2 | 95.0 | 94.6 | 93.8 | 93.0 |
| TRUE NEGATIVE (%) | 84.3 | 97.3 | 98.4 | 98.1 | 98.5 | 98.6 | 95.6 | 98.3 | 98.1 | 98.9 | 98.3 | 97.1 |
| TRUE POSITIVE (%) | 46.0 | 75.5 | 82.5 | 81.3 | 75.5 | 73.4 | 70.7 | 82.5 | 82.0 | 77.0 | 75.3 | 75.8 |
| FALSE NEGATIVE (%) | 19.4 | 24.0 | 17.3 | 18.7 | 24.5 | 26.6 | 7.2 | 17.3 | 18.0 | 23.0 | 24.7 | 24.2 |
| FALSE POSITIVE (%) | 0.1 | 1.2 | 1.6 | 1.8 | 1.4 | 1.3 | 0.1 | 1.7 | 1.9 | 1.1 | 1.7 | 2.9 |
| CLASSIFICATION QUALITY | 90.2 | 87.4 | 90.6 | 89.7 | 87.1 | 86.0 | 96.4 | 90.5 | 90.1 | 87.9 | 86.8 | 86.5 |

FIG. 34

| RESULTS (BEARING 3)-TRAINING SET 3 | | | | | | | | | | | | |
|---|---|---|---|---|---|---|---|---|---|---|---|---|
| K FACTOR | 1 | 10 | 25 | 50 | 75 | 100 | 1 | 10 | 25 | 50 | 75 | 100 |
| FEATURE SET TYPE | ALL FEATURES | | | | | | WAVELET FEATURES ONLY | | | | | |
| BINARY ATTRIBUTES | 138 | | | | | | 101 | | | | | |
| TRAINING TIME (S) | <1 | 1 | 3 | 10 | 18 | 27 | <1 | <1 | 2 | 7 | 12 | 18 |
| NORMAL PATTERNS | 1 | 16 | 46 | 96 | 146 | 196 | 1 | 19 | 49 | 99 | 149 | 199 |
| DEFECTIVE PATTERNS | 1 | 10 | 26 | 76 | 126 | 173 | 1 | 12 | 42 | 92 | 141 | 183 |
| ACCURACY (%) | 94.7 | 97.5 | 97.1 | 96.5 | 96.0 | 95.3 | 94.7 | 97.2 | 97.0 | 96.3 | 96.6 | 95.3 |
| TRUE NEGATIVE (%) | 96.0 | 97.9 | 97.2 | 98.4 | 98.6 | 98.7 | 96.0 | 97.8 | 98.2 | 98.4 | 98.4 | 97.4 |
| TRUE POSITIVE (%) | 89.0 | 95.7 | 96.7 | 89.0 | 85.4 | 81.3 | 89.0 | 94.7 | 92.1 | 87.5 | 89.2 | 86.6 |
| FALSE NEGATIVE (%) | 0.2 | 4.3 | 3.3 | 11.0 | 14.6 | 18.7 | 0.2 | 5.3 | 7.9 | 12.5 | 10.8 | 13.4 |
| FALSE POSITIVE (%) | 1.5 | 2.1 | 2.8 | 1.6 | 1.4 | 1.3 | 1.5 | 2.2 | 1.8 | 1.6 | 1.6 | 2.6 |
| CLASSIFICATION QUALITY | 99.3 | 96.9 | 97.0 | 93.6 | 91.9 | 90.0 | 99.3 | 96.2 | 95.1 | 92.9 | 93.8 | 92.0 |

FIG. 35

| RESULTS (BEARING 3)-DATA SET 4 | | | | | | | | | | | | |
|---|---|---|---|---|---|---|---|---|---|---|---|---|
| K FACTOR | 1 | 10 | 25 | 50 | 75 | 100 | 1 | 10 | 25 | 50 | 75 | 100 |
| FEATURE SET TYPE | ALL FEATURES | | | | | | WAVELET FEATURES ONLY | | | | | |
| BINARY ATTRIBUTES | 146 | | | | | | 111 | | | | | |
| TRAINING TIME (S) | <1 | <1 | 2 | 6 | 14 | 21 | <1 | <1 | 1 | 5 | 11 | 17 |
| NORMAL PATTERNS | 1 | 15 | 40 | 80 | 130 | 177 | 1 | 16 | 42 | 92 | 142 | 192 |
| DEFECTIVE PATTERNS | 1 | 10 | 25 | 50 | 75 | 100 | 1 | 17 | 47 | 97 | 122 | 150 |
| ACCURACY (%) | 94.5 | 96.9 | 97.1 | 96.9 | 96.9 | 96.9 | 92.0 | 96.8 | 96.8 | 97.1 | 97.1 | 97.1 |
| TRUE NEGATIVE (%) | 94.7 | 97.0 | 97.4 | 97.9 | 98.7 | 98.5 | 95.5 | 98.5 | 98.5 | 98.0 | 97.9 | 97.9 |
| TRUE POSITIVE (%) | 93.5 | 96.4 | 95.6 | 92.7 | 89.6 | 90.6 | 78.0 | 90.1 | 89.6 | 93.5 | 93.9 | 93.7 |
| FALSE NEGATIVE (%) | 1.7 | 3.6 | 4.4 | 7.3 | 10.4 | 9.4 | 1.9 | 9.9 | 9.9 | 6.5 | 6.1 | 6.3 |
| FALSE POSITIVE (%) | 1.8 | 3.0 | 2.6 | 2.1 | 1.3 | 1.5 | 1.0 | 1.5 | 1.4 | 2.0 | 2.1 | 2.1 |
| CLASSIFICATION QUALITY | 98.3 | 96.7 | 96.5 | 95.3 | 94.1 | 94.5 | 98.5 | 94.3 | 94.3 | 95.7 | 95.9 | 95.8 |

FIG. 36

| RESULTS (BEARING 3) - DATA SET 5 | | | | | | | | | | | | |
|---|---|---|---|---|---|---|---|---|---|---|---|---|
| K FACTOR | 1 | 10 | 25 | 50 | 75 | 100 | 1 | 10 | 25 | 50 | 75 | 100 |
| FEATURE SET TYPE | ALL FEATURES | | | | | | WAVELET FEATURES ONLY | | | | | |
| BINARY ATTRIBUTES | 177 | | | | | | 134 | | | | | |
| TRAINING TIME (S) | <1 | 1 | 3 | 11 | 19 | 28 | <1 | 1 | 3 | 11 | 20 | 31 |
| NORMAL PATTERNS | 2 | 20 | 50 | 85 | 135 | 185 | 2 | 20 | 50 | 100 | 150 | 200 |
| DEFECTIVE PATTERNS | 1 | 10 | 25 | 50 | 75 | 100 | 0 | 10 | 25 | 58 | 104 | 145 |
| ACCURACY (%) | 88.2 | 97.0 | 97.1 | 96.3 | 96.3 | 96.2 | 89.9 | 93.1 | 93.4 | 95.5 | 96.0 | 96.0 |
| TRUE NEGATIVE (%) | 95.4 | 98.7 | 98.7 | 98.8 | 98.8 | 98.5 | 96.9 | 98.0 | 97.3 | 96.9 | 96.8 | 96.9 |
| TRUE POSITIVE (%) | 58.7 | 90.0 | 90.8 | 85.9 | 85.9 | 86.7 | 61.2 | 72.6 | 77.4 | 89.6 | 92.5 | 92.5 |
| FALSE NEGATIVE (%) | 31.3 | 8.7 | 8.5 | 13.8 | 13.8 | 13.1 | 25.5 | 26.0 | 22.6 | 10.4 | 7.5 | 7.5 |
| FALSE POSITIVE (%) | 1.1 | 1.1 | 1.2 | 1.1 | 1.2 | 1.5 | 1.6 | 1.8 | 2.7 | 3.1 | 3.2 | 3.1 |
| CLASSIFICATION QUALITY (%) | 83.8 | 95.1 | 95.2 | 92.5 | 92.5 | 92.7 | 86.5 | 86.1 | 87.4 | 93.2 | 94.6 | 94.7 |

FIG. 37

| RESULTS (BEARING 4) - DATA SET 1 | | | | | | | | | | | | |
|---|---|---|---|---|---|---|---|---|---|---|---|---|
| K FACTOR | 1 | 10 | 25 | 50 | 75 | 100 | 1 | 10 | 25 | 50 | 75 | 100 |
| FEATURE SET TYPE | ALL FEATURES | | | | | | WAVELET FEATURES ONLY | | | | | |
| BINARY ATTRIBUTES | 113 | | | | | | 81 | | | | | |
| TRAINING TIME (S) | <1 | <1 | 1 | 5 | 9 | 15 | <1 | <1 | 1 | 5 | 10 | 16 |
| NORMAL PATTERNS | 1 | 10 | 32 | 82 | 132 | 182 | 1 | 18 | 46 | 96 | 146 | 205 |
| DEFECTIVE PATTERNS | 1 | 10 | 25 | 68 | 118 | 168 | 1 | 12 | 39 | 89 | 139 | 189 |
| ACCURACY (%) | 78.6 | 90.1 | 98.9 | 98.5 | 97.9 | 97.8 | 90.0 | 97.7 | 97.3 | 97.2 | 96.9 | 96.3 |
| TRUE NEGATIVE (%) | 75.3 | 87.1 | 99.0 | 98.8 | 98.6 | 98.9 | 88.5 | 98.8 | 98.0 | 97.4 | 97.0 | 95.9 |
| TRUE POSITIVE (%) | 85.7 | 96.3 | 98.7 | 97.8 | 96.5 | 95.6 | 93.4 | 95.1 | 95.9 | 96.6 | 96.8 | 97.2 |
| FALSE NEGATIVE (%) | 1.9 | 3.4 | 1.3 | 2.2 | 3.5 | 4.4 | 0.1 | 4.9 | 4.1 | 3.4 | 3.2 | 2.8 |
| FALSE POSITIVE (%) | 1.5 | 1.8 | 1.0 | 1.2 | 1.4 | 1.1 | 0.2 | 1.2 | 2.0 | 2.6 | 3.0 | 4.1 |
| CLASSIFICATION QUALITY (%) | 98.3 | 97.4 | 98.8 | 98.3 | 97.5 | 97.2 | 99.8 | 97.0 | 96.9 | 97.0 | 96.9 | 96.6 |

FIG. 38

| RESULTS (BEARING 4) - DATA SET 2 | | | | | | | | | | | | |
|---|---|---|---|---|---|---|---|---|---|---|---|---|
| K FACTOR | 1 | 10 | 25 | 50 | 75 | 100 | 1 | 10 | 25 | 50 | 75 | 100 |
| FEATURE SET TYPE | ALL FEATURES | | | | | | WAVELET FEATURES ONLY | | | | | |
| BINARY ATTRIBUTES | 132 | | | | | | 90 | | | | | |
| TRAINING TIME (S) | <1 | <1 | 1 | 4 | 9 | 15 | <1 | <1 | 1 | 4 | 8 | 15 |
| NORMAL PATTERNS | 1 | 10 | 25 | 62 | 112 | 149 | 1 | 10 | 30 | 70 | 120 | 170 |
| DEFECTIVE PATTERNS | 1 | 10 | 25 | 50 | 79 | 129 | 1 | 10 | 25 | 73 | 123 | 173 |
| ACCURACY (%) | 76.2 | 85.4 | 94.5 | 95.6 | 97.1 | 95.9 | 76.2 | 89.8 | 95.2 | 89.8 | 87.8 | 87.7 |
| TRUE NEGATIVE (%) | 83.9 | 85.9 | 98.2 | 98.1 | 99.0 | 98.2 | 83.9 | 91.0 | 96.8 | 91.4 | 89.3 | 89.1 |
| TRUE POSITIVE (%) | 59.7 | 84.2 | 86.7 | 90.4 | 93.2 | 91.0 | 59.7 | 87.2 | 91.6 | 86.3 | 84.7 | 84.7 |
| FALSE NEGATIVE (%) | 2.5 | 14.3 | 12.4 | 9.6 | 6.8 | 9.0 | 2.5 | 11.8 | 8.4 | 13.7 | 15.3 | 15.3 |
| FALSE POSITIVE (%) | 0.3 | 6.9 | 1.5 | 1.9 | 1.0 | 1.8 | 0.3 | 3.7 | 3.2 | 8.6 | 10.7 | 10.9 |
| CLASSIFICATION QUALITY (%) | 98.6 | 89.4 | 93.1 | 94.2 | 96.1 | 94.6 | 98.6 | 92.2 | 94.2 | 88.0 | 87.0 | 86.9 |

FIG. 39

| RESULTS (BEARING 4) - DATA SET 3 | | | | | | | | | | | | |
|---|---|---|---|---|---|---|---|---|---|---|---|---|
| K FACTOR | 1 | 10 | 25 | 50 | 75 | 100 | 1 | 10 | 25 | 50 | 75 | 100 |
| FEATURE SET TYPE | ALL FEATURES | | | | | | WAVELET FEATURES ONLY | | | | | |
| BINARY ATTRIBUTES | 127 | | | | | | 87 | | | | | |
| TRAINING TIME (S) | <1 | <1 | 2 | 5 | 10 | 18 | <1 | <1 | 2 | 5 | 12 | 20 |
| NORMAL PATTERNS | 1 | 10 | 34 | 68 | 116 | 163 | 1 | 17 | 47 | 96 | 152 | 202 |
| DEFECTIVE PATTERNS | 1 | 10 | 25 | 50 | 80 | 130 | 1 | 10 | 38 | 88 | 136 | 186 |
| ACCURACY (%) | 92.4 | 96.9 | 97.5 | 96.9 | 96.7 | 96.0 | 98.7 | 95.8 | 93.7 | 94.1 | 93.2 | 93.4 |
| TRUE NEGATIVE (%) | 96.5 | 99.9 | 99.9 | 99.7 | 99.7 | 99.8 | 99.9 | 98.9 | 98.3 | 99.3 | 99.0 | 99.3 |
| TRUE POSITIVE (%) | 83.6 | 90.7 | 92.2 | 91.0 | 90.2 | 88.0 | 96.2 | 89.2 | 83.9 | 82.8 | 80.8 | 80.9 |
| FALSE NEGATIVE (%) | 3.4 | 6.8 | 7.8 | 9.0 | 9.8 | 12.0 | 3.8 | 10.8 | 16.1 | 17.2 | 19.2 | 19.1 |
| FALSE POSITIVE (%) | 0.0 | 0.1 | 0.1 | 0.3 | 0.3 | 0.2 | 0.1 | 1.1 | 1.7 | 0.7 | 1.0 | 0.7 |
| CLASSIFICATION QUALITY (%) | 98.3 | 96.6 | 96.0 | 95.3 | 94.9 | 93.9 | 98.0 | 94.0 | 91.1 | 91.1 | 89.9 | 90.1 |

FIG. 40

| RESULTS (BEARING 4) - DATA SET 4 | | | | | | | | | | | | |
|---|---|---|---|---|---|---|---|---|---|---|---|---|
| K FACTOR | 1 | 10 | 25 | 50 | 75 | 100 | 1 | 10 | 25 | 50 | 75 | 100 |
| FEATURE SET TYPE | ALL FEATURES | | | | | | WAVELET FEATURES ONLY | | | | | |
| BINARY ATTRIBUTES | 174 | | | | | | 123 | | | | | |
| TRAINING TIME (S) | <1 | 1 | 3 | 9 | 17 | 27 | <1 | 1 | 4 | 9 | 22 | 27 |
| NORMAL PATTERNS | 1 | 14 | 44 | 94 | 144 | 194 | 1 | 16 | 46 | 96 | 144 | 191 |
| DEFECTIVE PATTERNS | 1 | 10 | 25 | 50 | 75 | 100 | 1 | 13 | 43 | 93 | 143 | 193 |
| ACCURACY (%) | 92.2 | 95.5 | 97.6 | 98.2 | 98.3 | 98.3 | 97.0 | 97.2 | 95.1 | 92.1 | 92.5 | 93.6 |
| TRUE NEGATIVE (%) | 95.5 | 99.7 | 99.6 | 99.5 | 99.5 | 99.5 | 96.2 | 99.3 | 98.1 | 93.3 | 94.4 | 96.5 |
| TRUE POSITIVE (%) | 85.2 | 86.6 | 93.3 | 95.3 | 95.7 | 95.7 | 98.7 | 92.6 | 88.7 | 89.6 | 88.4 | 87.2 |
| FALSE NEGATIVE (%) | 1.3 | 11.1 | 6.5 | 4.7 | 4.3 | 4.3 | 1.3 | 7.4 | 11.3 | 10.4 | 11.6 | 12.8 |
| FALSE POSITIVE (%) | 0.3 | 0.3 | 0.4 | 0.5 | 0.5 | 0.5 | 3.8 | 0.7 | 1.9 | 6.7 | 5.6 | 3.5 |
| CLASSIFICATION QUALITY (%) | 99.2 | 94.3 | 96.5 | 97.4 | 97.6 | 97.6 | 97.5 | 95.9 | 93.2 | 91.5 | 91.4 | 91.9 |

FIG. 41

| RESULTS (BEARING 4) - DATA SET 5 | | | | | | | | | | | | |
|---|---|---|---|---|---|---|---|---|---|---|---|---|
| K FACTOR | 1 | 10 | 25 | 50 | 75 | 100 | 1 | 10 | 25 | 50 | 75 | 100 |
| FEATURE SET TYPE | ALL FEATURES | | | | | | WAVELET FEATURES ONLY | | | | | |
| BINARY ATTRIBUTES | 198 | | | | | | 131 | | | | | |
| TRAINING TIME (S) | <1 | 1 | 7 | 11 | 32 | 50 | <1 | <1 | 6 | 21 | 44 | 67 |
| NORMAL PATTERNS | 1 | 15 | 45 | 95 | 145 | 215 | 1 | 17 | 47 | 97 | 153 | 204 |
| DEFECTIVE PATTERNS | 1 | 10 | 25 | 50 | 99 | 140 | 1 | 10 | 29 | 79 | 123 | 173 |
| ACCURACY (%) | 98.7 | 98.8 | 95.7 | 94.8 | 94.3 | 94.1 | 97.6 | 95.5 | 94.0 | 92.7 | 92.7 | 92.4 |
| TRUE NEGATIVE (%) | 99.7 | 99.0 | 96.9 | 96.2 | 95.8 | 95.6 | 99.7 | 97.7 | 95.7 | 94.5 | 94.5 | 94.2 |
| TRUE POSITIVE (%) | 100.0 | 100.0 | 100.0 | 100.0 | 100.0 | 100.0 | 96.3 | 99.7 | 100.0 | 100.0 | 100.0 | 100.0 |
| FALSE NEGATIVE (%) | 0.0 | 0.0 | 0.0 | 0.0 | 0.0 | 0.0 | 0.0 | 0.0 | 0.0 | 0.0 | 0.0 | 0.0 |
| FALSE POSITIVE (%) | 0.3 | 1.0 | 3.1 | 3.8 | 4.2 | 4.4 | 0.3 | 2.3 | 4.3 | 5.5 | 5.5 | 5.8 |
| CLASSIFICATION QUALITY (%) | 98.1 | 98.7 | 95.0 | 94.0 | 93.4 | 93.3 | 98.1 | 94.5 | 93.0 | 91.7 | 91.7 | 91.4 |

FIG. 42

|  | POSITIVE (DEFECTIVE) PATTERNS FOUND-WAVELET FEATURES ONLY | | | | | | | | | |
|---|---|---|---|---|---|---|---|---|---|---|
| FEATURE | 1 | 2 | 3 | 4 | 5 | 6 | 7 | 8 | 9 | 10 |
| WAVELET SCALE 12 |  |  |  |  |  |  |  |  |  |  |
| WAVELET SCALE 11 |  |  |  |  |  |  |  |  | >0.1985 | >0.1985 |
| WAVELET SCALE 10 |  |  |  |  |  |  |  | >0.221 |  |  |
| WAVELET SCALE 9 |  |  | >0.279 | >0.279 |  |  |  |  |  |  |
| WAVELET SCALE 8 |  |  |  |  |  |  |  |  |  |  |
| WAVELET SCALE 7 | >0.650 | >0.650 | >0.650 | >0.650 | >0.650 | >0.650 | >0.650 | >0.650 | >0.650 | >0.650 |
| WAVELET SCALE 6 |  |  |  |  | >1.357 | >1.357 | >1.357 | >1.357 |  |  |
| WAVELET SCALE 5 |  |  |  |  | >6.873 | >6.873 |  |  | >6.873 | >6.873 |
| WAVELET SCALE 4 | >10.32 |  |  |  |  |  |  |  |  |  |
| WAVELET SCALE 3 |  | >26.56 |  |  |  |  |  |  |  |  |
| WAVELET SCALE 2 |  |  |  | >47.46 |  | >47.46 | >47.46 |  |  | >47.46 |
| WAVELET SCALE 1 |  |  | >37.44 |  | >37.44 |  |  | >37.44 | >37.44 |  |
| CLASSIFICATION PWR | 90.63% | 90.92% | 84.97% | 84.97% | 89.58% | 89.58% | 90.18% | 82.29% | 84.38% | 84.38% |

FIG. 43

|  | POSITIVE (DEFECTIVE) PATTERNS FOUND-ALL FEATURES | | | | | | | | | |
|---|---|---|---|---|---|---|---|---|---|---|
| FEATURE | 1 | 2 | 3 | 4 | 5 | 6 | 7 | 8 | 9 | 10 |
| WAVELET SCALE 12 |  |  |  |  |  |  |  |  |  |  |
| WAVELET SCALE 11 |  |  |  |  |  | >0.198 | >0.198 | >0.198 | >0.198 | >0.198 |
| WAVELET SCALE 10 |  |  |  |  |  |  |  |  |  |  |
| WAVELET SCALE 9 |  |  |  |  |  | >0.279 | >0.279 | >0.279 | >0.279 | >0.279 |
| WAVELET SCALE 8 |  |  |  |  |  |  |  |  |  |  |
| WAVELET SCALE 7 |  |  |  |  |  | >0.650 | >0.650 | >0.650 |  |  |
| WAVELET SCALE 6 |  |  |  |  |  |  |  |  |  | >1.357 |
| WAVELET SCALE 5 |  |  |  |  |  | >6.873 | >6.873 | >6.873 | >6.873 | >6.873 |
| WAVELET SCALE 4 | >10.32 |  |  |  |  |  |  |  |  |  |
| WAVELET SCALE 3 |  | >26.56 |  |  |  |  |  |  |  |  |
| WAVELET SCALE 2 |  |  | >47.46 |  |  |  |  |  |  |  |
| WAVELET SCALE 1 |  |  |  |  |  |  | >37.44 |  |  | >37.44 |
| PEAK VALUE |  |  |  |  |  |  |  | >0.585 | >0.585 |  |
| RMS VALUE |  |  |  | >0.0011 |  |  |  |  |  |  |
| KURTOSIS |  |  |  |  |  |  |  |  |  |  |
| SKEWNESS |  |  |  |  |  |  |  |  |  |  |
| STD DEVIATION |  |  |  |  | >0.089 |  |  |  |  |  |
| CREST FACTOR |  |  |  |  |  | >469.3 |  |  |  |  |
| CLASSIFICATION PWR | 95.98% | 98.36% | 97.47% | 97.77% | 98.21% | 77.23% | 80.65% | 78.13% | 79.02% | 95.98% |

FIG. 44

| | REASON-FOR-REMOVAL CODE | | | TIME-TO-REMOVAL CODES | | | |
|---|---|---|---|---|---|---|---|
| | LAST | 2nd LAST | 3rd LAST | LAST REMOVAL | 2nd LAST REMOVAL | 3rd LAST REMOVAL | |
| 1 | 2 | 0 | 0 | 413.73 | 99999 | 99999 | NEGATIVE (NON-ROGUE) |
| 2 | 2 | 0 | 0 | 21.99 | 99999 | 99999 | |
| 3 | 2 | 0 | 0 | 366.81 | 99999 | 99999 | |
| 4 | 3 | 2 | 0 | 194.72 | 477.67 | 99999 | |
| 5 | 2 | 3 | 2 | 1288.99 | 196.70 | 125.15 | |
| 6 | 2 | 0 | 0 | 266.76 | 99999 | 99999 | |
| 7 | 2 | 0 | 0 | 1503.23 | 99999 | 99999 | |
| 8 | 2 | 0 | 0 | 0 | 99999 | 99999 | |
| 9 | 5 | 2 | 2 | 1045.42 | 1451.63 | 133.41 | |
| 10 | 2 | 0 | 0 | 212.47 | 99999 | 99999 | |
| 11 | 3 | 0 | 0 | 616 | 99999 | 99999 | |
| 12 | 2 | 3 | 0 | 284.08 | 539.97 | 99999 | |
| 13 | 3 | 0 | 0 | 304 | 99999 | 99999 | |
| 14 | 2 | 2 | 2 | 144.08 | 57.6 | 132.7 | POSITIVE (ROGUE) |
| 15 | 2 | 2 | 2 | 204 | 281.20 | 83.7 | |

|  | MAX. DEGREE 1 | MAX. DEGREE 2 | MAX. DEGREE 3 |
|---|---|---|---|
| NO. BINARY ATTRIBUTES | 49 | | |
| NO. NEGATIVE PATTERNS | 25 | 125 | 125 |
| NO. POSITIVE PATTERNS | 7 | 274 | 330 |

FIG. 47

| OBSERVATION | MAX. DEGREE 2 | MAX. DEGREE 3 | MAX. DEGREE 4 |
|---|---|---|---|
| 1 | -0.7617 | -0.8542 | -0.8542 |
| 2 | -0.6191 | -0.6093 | -0.6093 |
| 3 | -0.6925 | -0.6194 | -0.6194 |
| 4 | -0.8513 | -0.8664 | -0.8664 |
| 5 | -0.5479 | -0.7999 | -0.7575 |
| 6 | -0.6130 | -0.6793 | -0.6793 |
| 7 | -0.7617 | -0.8542 | -0.8542 |
| 8 | -0.6925 | -0.6194 | -0.6194 |
| 9 | -0.6864 | -0.6893 | -0.6893 |
| 10 | -0.6486 | -0.4982 | -0.4918 |
| 11 | -0.6864 | -0.6893 | -0.6893 |
| 12 | -0.6884 | -0.8441 | -0.8441 |
| 13 | -0.6864 | -0.6893 | -0.6893 |
| 14 | 0.3794 | 0.5035 | 0.4137 |
| 15 | 0.1978 | 0.4535 | 0.3958 |

FIG. 48

|  | MAX. DEGREE 2 | MAX. DEGREE 3 | MAX. DEGREE 4 |
|---|---|---|---|
| Q | 0.8263 | 0.9965 | 0.9965 |
| TP | 0.3333 | 1 | 1 |
| FP | 0 | 0 | 0 |
| TN | 0.9718 | 0.9859 | 0.9859 |
| FN | 0 | 0 | 0 |

FIG. 49

TOOL AND METHOD FOR FAULT DETECTION OF DEVICES BY CONDITION BASED MAINTENANCE

FIELD

The present tool and method relate to fault detection and prediction of at least one device by condition based maintenance, and more particularly to fault detection and prediction using Logical Analysis of Data.

BACKGROUND

Manufacturing firms face great pressure to reduce their production costs continuously. One of the main expenditure sources for these firms is maintenance costs which can reach 15-70% of production costs. In capital intensive industries, maintenance costs as a percentage of total value-added costs can be as high as 20-50% in mining, 15-25% for primary metals and 3-15% for processing and manufacturing industries. For this reason there has been an increasing interest in the area of maintenance management. In contrast with corrective maintenance, where actions are performed after system failure, and time-based preventive maintenance which sets a periodic interval to perform preventive maintenance regardless of the system's health, condition-based maintenance (CBM) is a program that recommends actions based on the information collected through condition monitoring. A CBM program, if properly established and effectively implemented, can significantly reduce maintenance costs by reducing the number of unnecessary scheduled preventive maintenance operations.

A CBM program consists of three key steps: data acquisition to obtain data relevant to system health, data processing to handle and analyze the data collected and maintenance decision-making, recommending efficient maintenance actions.

Data acquisition is the process of collecting and storing useful data from the targeted system. This step in a CBM program has improved dramatically over the years due to the availability of many types of sensors at affordable prices.

Many models, algorithms and techniques have recently been available for data processing and analysis. They depend mainly on the type of data collected, and whether they are value type data, such as oil analysis, waveform type data such as vibration data, or multidimensional type data such as X-ray images. The process of extracting useful information from raw signals is called feature extraction. Extracted features are then used for device fault diagnostics, which is also called pattern recognition and classification.

Statistical techniques such as multivariate analysis and principal component analysis are used to extract useful features from raw maintenance data and to detect whether a specific fault is present or not, based on the condition monitoring information. Some researchers (Stellman C. M., Ewing K. J., Bucholtz F., Aggarwal I. D., Monitoring the degradation of a synthetic lubricant oil using infrared absorption fluorescence emission and multivariate analysis: A feasibility study. Lubrication Engineering, 1999, 55, 42-52) used multivariate analysis to study the deterioration of lubricants in device. Others (Allgood G. O., Upadhyaya B. R., A model-based high frequency matched filter arcing diagnostic system on principal component analysis (PCA) clustering. Application and Science of Computational Intelligence III, 2000, 4055, 430-440) proposed a condition diagnostic system based on the application of the principal components analysis (PCA) technique. The main drawback of statistical techniques is the necessity of making certain assumptions regarding the posteriori class probabilities.

Support vector machine (SVM) is also used extensively in device fault diagnostics, as described in (Korbicz J., Koscielny J. M., Kowalczuk Z., Cholewa W., Fault Diagnosis Models, Artificial Intelligence Applications, Springer, Berlin, 2004. lication and Science of Computational Intelligence III, 2000, 4055, 430-440), (Poyhonen P., Jover H. Hyotyniemi, Signal processing of vibrations for condition monitoring of an induction motor. *ISCCP First International Symposium on Control Communications and Signal Processing,* 2004, 499-502) and (Guo M, Xie L, Wang S. Q., Zhang J. M., research on an integrated ICA-SVN based framework for fault diagnosis. *Proceedings of the* 2003 *IEEE International Conference on Systems, Man and Cybernetics,* 2003, 3, 2710-2715). This technique finds an optimal hyperplane that maximizes the margin between two classes via mathematical programming (Bishop. C. M., *Pattern Recognition and Machine Learning,* Springer, 2006; Duda R. O., Hart P. E., Stork D. G., *Pattern Classification,* second, edition, John Wiley and Sons, 2001). The accuracy of this technique depends on the quality of the boundary curve found.

Another known method for extracting features relates to popular artificial intelligence technique for device fault diagnosis also known as artificial neural networks technique (ANN). Feedforward neural network (FFNN) is the most widely used neural network structure in device fault diagnosis (Fan Y., Li C. J., Diagnostics rule extraction from trained feedforward neural networks. *Mechanical Systems and Signal Processing,* 2002, 16, 1073-1081). The limitations of this technique are the difficulty in determining the network structure, the number of nodes, and the difficulty of interpreting the classification process.

SUMMARY

The present relates to a tool and method for performing device fault detection for condition based maintenance, diagnosis and prognostic.

In a particular aspect, the present tool comprises a database, a binarization module, a machine learning data mining module, and a processor. The database stores a plurality of measured indicators representative of at least one dynamic condition of at least one device. The binarization module binarizes the measured indicators. The machine learning data mining module analyzes the binarized measured indicators and extracts patterns that are indicative of whether the device has a fault or not. The processor computes a discriminate function using the extracted patterns in order to detect at least one fault of the device and a prognostic predicting a state of the at least one device.

In another particular aspect, the machine learning data mining module is adapted for performing multi-classification.

In yet another particular aspect, the machine learning data mining module is capable of performing unsupervised learning.

In an aspect, the measured indicators consist of one or several of the following: a value, type of value, a component, a location, a date, time, and identification of a corresponding sensor.

In another aspect, the type of value consists of any of the following: pressure, temperature, amplitude, torque, revolution per minute, tension, wattage, humidity level, density, nominal value, discrete value, descriptive value, and chemical content.

In yet another aspect, the machine learning data mining module uses a Logical Analysis of Data (LAD) module based on a pattern generation algorithm.

In another aspect, the present tool further comprises one or several of the following: a graphical user interface, a memory and/or a reporting module.

In a particular aspect, the processor further computes a diagnostic and/or a prognostic.

In yet another aspect, the present relates to a method comprising: storing in a database a plurality of measured indicators representative of at least one dynamic condition of a device; binarizing the plurality of measured indicators and analyzing the plurality of binarized measured indicators using a machine learning data tool by extracting a pattern from the binarized measured indicators using Mixed Integer Linear Programming and by adding at least one different constraint to each iteration, the pattern being indicative of whether the device has a fault or not.

BRIEF DESCRIPTION OF THE DRAWINGS

The following figures are used to depict and provide examples related to the present tool and method.

FIG. 3-10 show results of binarization, pattern generation, and classification processes for the testing sets for the three problems respectively of the example related to power transformer (2).

FIG. 14 is a table showing the numerical features obtained from each processing technique of example 1.

FIG. 23 is a table showing examples of two patterns that separate between energy discharge defects and thermal heating defects.

FIG. 24 shows the rules used for diagnosing a machine using the Rogers ratio Method.

FIG. 25 is a table depicting 10 Rules derived from some of the patterns that classify input observations to thermal and non-thermal defects.

FIG. 26 is a table showing 10 Rules derived from some of the patterns that classify input observations to PD and Energy Discharge defects.

FIG. 27 is a table representing 10 Rules derived from some of the patterns that classify input observations to D1 and D2 defects.

FIG. 28 is a table representing 10 Rules derived from some of the patterns that classify input observations to T1/T2 and T3 defects.

FIG. 29 is a table depicting proportion of erroneously classified observations.

FIG. 30 is a table describing the classification of tests based on the testing classes.

FIG. 31 is a table representing database composition of bearing 3, describing the sizes and composition of 5 different data sets.

FIG. 32 is a table representing database composition of bearing m4 is divided in 5 different ways into 5 data sets the signal database of bearing 4 is divided in 5 different ways into 5 data sets, whose composition is shown in FIG. 32.

FIG. 33 is a table depicting classification results using a training set of 21 normal signals and 4 defective signals from data set 1 chosen from the signal database bearing 3. The table shows training times, the number of patterns and some performance statistics.

FIG. 34 is a table representing classification results using a training set of 23 normal signals and 5 defective signals from data set 2 chosen from the signal database bearing 3. The table further shows training times, the number of patterns created and some performance statistics.

FIG. 35 is a table representing classification results using a training set of 28 normal signals and 7 defective signals from data set 3 chosen from the signal database bearing 3. The table shows training times, the number of patterns created and some performance statistics.

FIG. 36 is a table representing classification results using a training set of 34 normal signals and 9 defective signals from data set 4 chosen from the signal database bearing 3. The table shows training times, the number of patterns created and some performance statistics.

FIG. 37 is a table representing classification results using a training set of 43 normal signals and 10 defective signals from data set 5 chosen from the signal database bearing 3. The table shows training times, the number of patterns and some performance statistics.

FIG. 38 is a table representing classification results using a training set of 20 normal signals and 10 defective signals from data set 1 chosen from the signal database bearing 4. The table shows training times, the number of patterns and some performance statistics.

FIG. 39 is a table representing classification results using a training set of 43 normal signals and 10 defective signals from data set 2 chosen from the signal database bearing 4. The table shows training times, the number of patterns created and some performance statistics.

FIG. 40 is a table representing classification results using a training set of 27 normal signals and 12 defective signals from data set 3 chosen from the signal database bearing 4. The table shows training times, the number of patterns created and some performance statistics.

FIG. 41 is a table representing classification results using a training set of 32 normal signals and 15 defective signals from data set 4 chosen from the signal database bearing 4. The table shows training times, the number of patterns created and some performance statistics.

FIG. 42 is a table representing classification results using a training set of 36 normal signals and 17 defective signals from data set 5 chosen from the signal database bearing 4. The table shows training times, the number of patterns created and some performance statistics.

FIGS. 43 and 44 represent respectively the positive (defective) patterns that were found by two decision models.

FIG. 47 is a table providing the number of binary attributes obtained and the number of positive and negative patterns found for each decision model.

FIG. 48 is a table describing a value of Discriminant function Δ for all 3 Decision Models.

FIG. 49 is a table showing the results for the three decision models of FIGS. 47 and 48.

DETAILED DESCRIPTION

Figure 1:
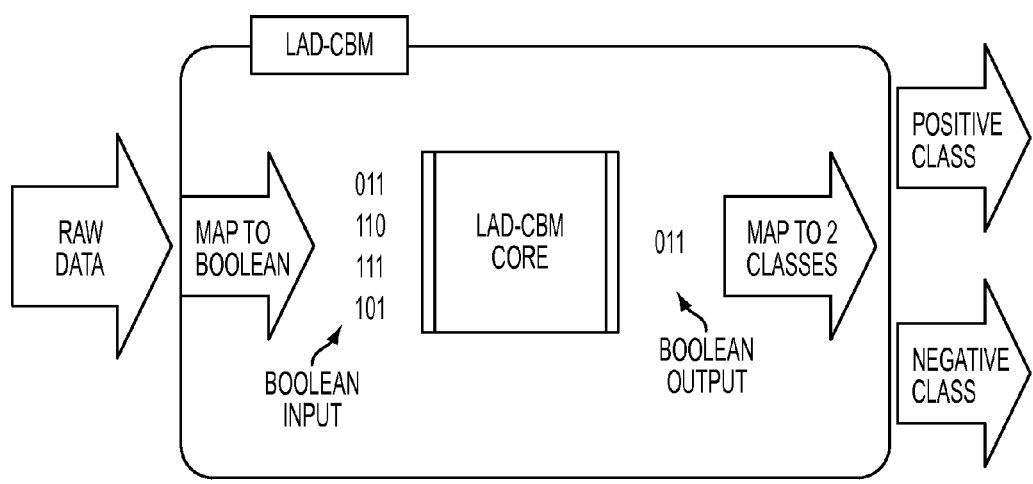
FIG. 1 is a schematic diagram depicting binarization and mapping of classes using the present tool and method.

Throughout the present specification and claims, the term "device" is used to refer to any machine, equipment, apparatus, tool, system, sub-system, component and/or sub-component used for performing a specific task, and which may be monitored by means of at least one sensor of any type known in the industry, or by humans.

The following specification is further directed at the application of Condition-Based Maintenance (CBM) for electromechanical equipment, but the present tool and method are not limited to such a device, as other example of applications will also be provided further. Thus reference to electromechanical equipment is used only as an example, and the present tool and method should not be construed as being limited to such a type of devices.

Thus, the present tool and method propose the use of LAD algorithm (and a variant hereinafter called multilayer LAD) on binarized measured indicators to identify change of state in a measured device or measured devices to perform fault diagnosis and/or fault prognosis.

The present relates to an artificial intelligence data mining tool relying on LAD algorithm and method for device fault diagnostics. The present tool and method avoid the drawbacks and limitations of the current diagnostic techniques. The present tool and method do not need any statistical assumptions and does not use any statistical techniques, but do provide pattern recognition and faults classification that are easy and straightforward to interpret.

The present method and tool use Logical Analysis Data (LAD) software for identification of a device state, in particular a state of potential failure, which begins by a transition from a state of normal functioning. Identification of the state transition permits the planning of maintenance actions, and a decrease of the risk of failure.

The present tool and method apply LAD for determining diagnosis and/or prognosis of a condition of a device.

In a particular aspect, the present tool and method are based on a multilayered LAD classification technique based on Mixed Integer Linear Programming (MILP) for the diagnosis of faults in devices.

Example of Prior Art Condition-Based Maintenance

The application of CBM to electromechanical equipment through indicator data monitoring has proven an effective method for safeguarding expensive machinery and assuring its continuous operation. One such application is for example power transformers which are high-priced items that require continuous monitoring in order to detect any fault in their operation before the arrival of any safety hazards that may affect the equipment itself and/or the related power systems. The most effective method for fault diagnosis in power transformers known to date is dissolved gas analysis (DGA). This method relies on the phenomenon of chemical breakdown of oil into hydrocarbon gases at certain environmental conditions to detect faults in the transformer. The composition of the gases produced can be related to the type of fault that has occurred even though many non fault-related factors have a considerable influence. Several expert based diagnostic interpretations of the patterns relating gas composition to specific faults have been published in the last decades. Most of them take into account the presence of the gases H2, CH4, C2H6, C2H4 and C2H2 and their ratios with respect to each other. The most common diagnostic interpretations are the Burton & Davis ratios (1972), the Rogers ratios (1974), the Duval Triangle (1970s), the Dornenburg ratios, and most recently, the revised IEC 60599 (1999).

IEC 60599 uses the outputs of three ratios obtained from the above five gases to classify power transformers into 5 fault states:

Partial Discharges (PD): Discharges of either cold plasma (corona) type, which could possibly result in X-wax deposition, or sparking type.

Low Energy Discharges (D1): Discharges of low energy resulting in larger paper perforations, tracking, or carbon particles in oil.

High Energy Discharges (D2): Discharges of high energy resulting in extensive carbonization, metal fusion, and, possibly, tripping of the equipment.

Thermal Faults (T1/T2): Below 300° C. (T1) when paper has turned brownish, above 300° C. (T2) when paper has carbonized.

Thermal Faults above 700° C. (T3): When oil carbonization, metal coloration, or fusion occurs.

Traditionally, gas levels were obtained by either taking oil samples manually or through an on-line gas monitor connected to the oil circuit and arranged to take regular samples, and analyze samples at regular intervals. After obtaining the analyzed data and calculating the required ratios, classification was done based on one of the expert based diagnostic approaches mentioned above. However, in the past years, several researchers have studied ways to automate this CBM classification process by applying different data processing techniques combined with classification techniques.

Prior Art Data Processing

A good classification is only as good as the information it is based upon. For this reason, relevant information must be extracted from raw gas data using different processing techniques and fed to the classifiers. For many automated classification techniques, the processing consists in a manual selection of key gases and normalization of the gas content levels, such as processing a raw gas data by calculating a relative content of five characteristic gases in addition to absolute information for each sample. For other classification techniques, data is processed by calculating the ratios by expert base classifiers.

Prior Art Automated Classification Techniques

Many classification techniques have been used in automating fault diagnosis process, such as the power transformer fault diagnosis process. The most common approaches have been fuzzy logic, Artificial Neural Network, combined fuzzy neural techniques, and support vector machines (SVM).

Logical Analysis of Data (LAD)

Logical Analysis of Data (LAD) is a supervised learning pattern recognition technique that was first developed by P L Hammer in 1986 as a Boolean technique that identifies the effects of a certain event by investigating a set of factors representing all the possible effects of that event. LAD has been successfully used as a classification technique primarily in medical applications. Several variations on the LAD algorithm have been developed over the years targeting particularly the pattern generation step of LAD.

LAD allows classification of phenomena based on features' extraction and pattern recognition. It is particularly useful in applications where the volume of data is very large. In fact, the classification accuracy of LAD depends on the size of the database. Like many artificial intelligence techniques, LAD is applied in two consecutive phases, learning or training phase, where part of the database is used to extract special features or patterns of some phenomena, and a testing phase where the rest of the database is used to test the accuracy of the previous findings. LAD is a technique based on supervised learning; which means that the database contains indicators measurements and their corresponding classes. After the accomplishment of the two previously mentioned phases the new measurements are introduced to LAD in order to be classified.

More particularly, LAD finds distinctive patterns which can separate data into at least 2 classes. Training LAD requires the presence of a pre-classified database from which the classification model can be extracted. This pre-classified database is referred to herein as a training data set and consists of instances or observations which outcome is already known. The training phase of LAD can thus be divided into 3 broad steps: Data Binarization, Pattern Generation, and Theory Formation.

LAD Training Phase: Data Binarization

As LAD operates by finding patterns in Boolean data, the binarization of input data is the first step in training the algorithm. The input data of any classifier consists of a set of features and their values at different instances or for different observations. Features can be divided into three categories: discrete unordered, discrete ordered, and numerical. The most common type of features encountered in fault diagnosis of machinery is numerical. A numerical feature (e.g. Vibration Amplitude, $H_2$ Gas Content, etc. . . . ) can take any real number for a value. The binarization of such features depends on the different values taken in the training data set. The method starts by aligning the observed values of that feature in increasing order. For a feature A, the result of the alignment could be displayed as follows: $\alpha_{A_1} < \alpha_{A_2} < \ldots < \alpha_{A_m}$ where $\alpha_{A_m}$ is a highest value observed for feature A in the training data set and in is a total number of distinct values that numerical feature A has taken within the training data set. Naturally, the inequality m≤N, such that N is a total number of observations in the training data set, holds. Cut-points are then introduced between each pair of values $\alpha_{A_i}$ and $\alpha_{A_{i+1}}$ for which there exists observations $u_A' \in S^+$ and $u_A'' \in S^-$ where $u_A' = \alpha_{A_i}$ and $u_A'' = \alpha_{A_{i+1}}$ or vice-versa. $S^+$ is a set of observations in the training data set belonging to a first (positive) class whereas $S^-$ is a set representing a second (negative) class. The easiest way to compute the cut-point is by averaging two consecutive values. Thus, a resulting cut-point of the example given above is $\beta_{Ai} = (\alpha_{A_i} + \alpha_{A_{i+1}})/2$, and a binary attribute $b_{Ai}$ created by this cut-point is defined as:

$$b_{Ai} = \begin{cases} 1 & \text{if } A \geq \beta_{Ai} \\ 0 & \text{if } A < \beta_{Ai} \end{cases} \quad (1)$$

The total number of binary attribute(s) describing a numerical feature depends on a number of transitions between distinct values from positive to negative observations and vice versa. After data binarization, a total amount of binary attributes that represent the numerical features of the training data set is usually substantially higher than the number of original numerical features. FIG. 1 shows a schematic representation of the binarization step of LAD.

Concepts of Pattern Generation Procedure

To describe the pattern generation procedure, some concepts are introduced. In Boolean algebra, a literal is either a Boolean variable or its negation. A term is a conjunction of literals. The degree of a term is the number of literals in it. A term is said to cover an observation if this term is found in this observation. A candidate term is a term that covers at least one positive observation and one negative observation. A characteristic term of an observation is the unique term of degree n that covers this observation.

LAD Training Phase: Pattern Generation

After binarizing the training data set, a pattern generation technique is used to extract patterns from it. This is arguably the most critical stage of the LAD algorithm, and as such, has been the subject of a large amount of research. A pattern of degree d, in its strictest sense, is defined as a conjunction of d literals such that it is true for at least one observation of a class $S^+(S^-)$ and not true for the observations of the other class $S^-(S^+)$. A pattern that is true for some observations of one class is said to cover these observations and as such, belongs to that particular class. Consequently, for a two class classifier, a generated pattern can be one of two types: a positive pattern ($p^+$) or negative pattern ($p^-$). Throughout this text, as the operations involving the generation of positive and negative patterns are symmetric, we shall refer to a pattern belonging to a certain class and its opposite by the notations * and $\overline{*}$, where * can be replaced by + and $\overline{*}$ by − when referring to positive pattern generation and vice versa. Consequently, a pattern of a certain class is referred to by the notation p*, and a set of observations of the opposite class is referred to by the notation $S^{\overline{*}}$.

Four special non-mutually exclusive types of patterns exist: prime, spanned, strong and maximal. A prime pattern has the least number of literals possible such that if any literal is dropped, it will cease to be a pattern. Prime patterns are more global since they cover more observations, and are easily interpretable. A pattern is qualified as spanned if, for the same covered observations, it is composed of the maximum number of literals possible; i.e. if any other literal is added, then it will cease to be a pattern. Spanned patterns, by definition, possess less generalization power than other pattern types. A pattern $p_i$* is defined as strong if no other pattern $p_j$* exists such that the set $c_{Pi}$* of observations that are covered by $p_i$* is a subset of $c_{pj}$*. In a publication titled 'Maximum patterns in datasets by T. O. Bonates, Peter L. Hammer and A. Kogan published in 2007 detailed description of these 3 types of patterns is offered. A maximal pattern $p_i$* for a certain observation in S* is one, which has the most coverage among all the patterns covering that specific observation.

LAD Training Phase: Strong Pattern MILP

Many techniques for pattern generation have been described in the literature. The earliest of these techniques were enumeration based. Enumeration based techniques lead to the generation of all possible patterns of a certain type from the training data set, which takes up large computational time. Other pattern generation techniques are based on heuristics and linear approximation. Most recently, patterns generated using Mixed Integer Linear Programming (MILP) were proposed. This MILP based pattern generation approach has been shown to offer equivalent performance with a far lower computational complexity than other pattern generation techniques.

A publication by Hong Seo Ryoo et In-Yong Jang titled 'MILT approach to pattern generation in logical analysis of data, in Discrete Applied Mathematics (hereinafter referred as Ryoo et al.) proposed different formulations of linear set covering problems to generate different types of patterns. Ryoo et al introduces improvements to the MILP based pattern generation approach. More particularly, Ryoo et al. introduces a Boolean vector $w(w_1, w_2, \ldots, w_{2q})$ which dimension n=2q is double that of binarized observation vectors $v(b_1, b_2, \ldots, b_q)$ that make up the binarized training data set; where q is a total number of binary attributes resulting from the binarization of the numerical features. The elements $w_1, w_2, \ldots, w_q$ of vector w are relative to the literals $x_1, x_2, \ldots, x_n$ respectively such that if $w_j=1$ then the literal $x_j$ is included in pattern p*. Similarly, elements $w_{q+1}, w_{q+2}, \ldots, w_{2q}$ are relative to literals $\bar{x}_1, \bar{x}_2, \ldots, \bar{x}_n$ respectively, such that if $w_{q+j}=1$ then literal $\bar{x}_j$ is included in the pattern p*. For example, for a binary training data set of dimension q=4, a pattern $p^* = \bar{x}_1 \wedge x_2 \wedge \bar{x}_4$ is represented by the Boolean vector w(0,1,0,0,1,0,0,1). Naturally, a pattern cannot include both the literal $x_j$ and its negation $\bar{x}_j$ at the same time. For that reason a condition $w_j + w_{q+j} \leq 1$, must be added to any set covering problem that generates patterns.

Each observation vector $v_i(b_1, b_2, \ldots, b_q)$ either belongs to the class set S* or $S^{\bar{*}}$. To generate a strong pattern p*, each observation $v_i$ is associated with the Boolean vector $\alpha_i(\alpha_{(i,1)}, \alpha_{(i,2)}, \ldots, \alpha_{(i,q)}, \alpha_{(i,q+1)}, \alpha_{(i,q+2)}, \ldots, \alpha_{(i,2q)})$, such that $\alpha_{(i,j)}=1, j \in \{1, 2, \ldots, q\}$ if $v_i(b_j)=1$ and $\alpha_{(i,q+j)}=1, j \in \{1, 2, \ldots, q\}$ if $v_i(b_j)=0$. The same condition of mutual exclusivity holds for $\alpha_{(i,q)}$ and $\alpha_{(i,q+j)}$ where both cannot be 1 at the same time.

A linear set covering algorithm that generates one pattern p* has, as variables: the elements of the vector $w(w_1, w_2, \ldots, w_{2q})$ associated with p*, the elements of the Boolean vector $y(y_1, y_2, \ldots, y_{N^*})$ where $y_i=0$ if $v_i \in S^*$ is covered by p* and $y_i=1$ otherwise and N* is the total number of observations in S*, and a degree d of p*. The resulting MILP model for generating a strong pattern is as follows:

$$\min_{w,y,d} \sum_{v_i \in S^*} y_i \quad (2)$$

$$\text{s.t.} \begin{cases} \sum_{j=1}^{2q} a_{(i,j)} w_j + q y_i \geq d & \forall v_i \in S^* \quad (a) \\ \sum_{j=1}^{2q} a_{(i,j)} w_j \leq d - 1 & \forall v_i \in S^{\bar{*}} \quad (b) \\ w_j + w_{q+j} \leq 1 & j = 1, 2, \ldots, q \quad (c) \\ \sum_{j=1}^{2q} w_j = d & (d) \\ 1 \leq d \leq q & (e) \\ w \in \{0, 1\}^{2q} & (f) \\ y \in \{0, 1\}^{N^*} & (g) \end{cases}$$

The objective of equation (2) is to minimize the number of observations in S* that are not covered by pattern p* while at the time satisfying the following 2 major sets of conditions:

If the resulting pattern p* covers an observation $v_i \in S^*$, then $\sum_{j=1}^{2q} \alpha_{(i,j)} w_j = d$, where d is the degree of the pattern. However, if an observation $v_i \in S^*$ is not covered, then $\sum_{j=1}^{2q} \alpha_{(i,j)} w_j < d$ and the value $qy_i$ added to the left side of condition (a) is there to compensate.

A pattern p* should not cover any observation $v_i \in S^{\bar{*}}$, and for that reason, condition (b) $\sum_{j=1}^{2q} \alpha_{(i,j)} w_j \leq d-1$ should hold for all such observations.

The proof that the above MILP model generates a strong pattern is also provided by Ryoo et al. To generate a strong positive pattern, * and $\bar{*}$ are replaced in the above functions by + and − respectively. The opposite applies for a strong negative pattern. A linear programming (LP) solver tool can be used to solve equation (2) and generate the resulting strong pattern. For generating a different pattern type, a modification of the objective function is sufficient.

Improvements to MILP Pattern Generation Model

Thus the present tool and method also propose improvements to enhance the performance of the MILP pattern generation model by addressing the weaknesses discussed above. To that effect, two alterations are suggested: an improvement to the MILP model and an improvement to the looping scheme that generates the entire pattern set, in order to increase the amount of patterns that cover each observation in the training data set.

Starting from the strong pattern generation algorithm explained in the previous section the present tool and method introduce a series of constraints to generate, in addition to the strongest pattern, the subsequent strong patterns iteratively. Naturally, a first iteration of the MILP pattern generation algorithm generates the strongest pattern possible and does not contain any added constraints. Thus the present tool and method add one constraint to the MILP pattern generation algorithm each time a new pattern is generated. The added constraints simply prevent the algorithm from finding the same pattern found in the previous iterations. This set of constraints is added as (h) to equation (2) and is represented as follows:

$$\sum_{j=1}^{2q} r_{(k,j)} w_j \leq d_k - 1 \quad \forall p_k^* \in P^* \quad (h)$$

The vector $r_k(r_{(k,1)}, r_{(k,2)}, \ldots, r_{(k,2q)})$ is assigned to each pattern $p_k^*$ found so far and is such that:

$$r_{(k,j)} = \begin{cases} 1 & \text{if } (x_j \in p_k^*, 1 \leq j \leq q) \text{ OR } (\bar{x}_j \in p_k^*, q < j \leq 2q) \\ -1 & \text{if } (x_j \notin p_k^*, 1 \leq j \leq q) \text{ OR } (\bar{x}_j \notin p_k^*, q < j \leq 2q) \end{cases}$$

The notation $x_j \in p_k^*$ means that literal $x_j$ is found in the conjunction of literals that form pattern $p_k^*$. If the candidate new pattern represented by the Boolean vector $w(w_1, w_2, \ldots, w_{2q})$ is identical to an existing pattern $p_k^*$, then the sum $\sum_{i=1}^{2q} r_{(k,j)} w_j$ will be equal to the number of degrees $d_k$ of pattern $p_k^*$. In all other cases the inequality holds. The improved MILP pattern generation algorithm formed by the addition of the constraints (h) is herein referred as MILP-h.

Theorem 1.

Let P* be a set of the strongest patterns covering S*. If $P^* \neq \mathcal{P}^*$ where $\mathcal{P}^*$ is the set of all patterns covering S*, then MILP-h admits a feasible solution (w,y,d) that can be translated to a pattern p* of degree d:

$$p^* = \bigwedge_{\substack{w_j=1 \\ 0 \leq j \leq q}} x_j \bigwedge_{\substack{w_j=1 \\ q<j\leq 2q}} \bar{x}_j \quad (3)$$

Proof.

Ryoo et al. proved that, without the presence of the set of conditions (h), the MILP model generates an optimal feasible solution that constitutes a strong pattern. Following the logic of these proofs, MILP-h model has at least one feasible solution that is a pattern. As explained previously, a conjunction of literals is said to be a pattern p* if it covers at least one observation S* and no observations $S^{\bar{*}}$. As $P^* \neq \mathcal{P}^*$, then there exists at least one observation in S* for which not all the possible patterns that cover it are in P*. For an observation $v_i$ in S* that satisfies that particular criterion, the elements of vector w in MILP-h are set as equal to those of vector $\alpha_i$ associated with observation $v_i$; i.e. $w_j=1$ if $\alpha_j=1$ and $w_j=0$ otherwise. Also, $y_i=1$ is set for all $v_i \in S^*$, $i \neq l$. As a result, the degree d is automatically set to q. These changes satisfy the conditions (a) through (g) of MILP-h. As proven in Ryoo et al., such a solution is a pattern of degree q as the resulting p* covers at least one observation $v_l \in S^*$ and no observations in $S^{\bar{*}}$ through conditions (a) and (b) respectively:

$$p^*(v_l) = p^* = \prod_{0 \leq j \leq 2q} a_{(l,j)} w_j = 1$$

$$p^*(v_i) = p^* = \prod_{0 \leq j \leq 2q} a_{(i,j)} w_j = 0$$

$$\forall v_i \in S^{\bar{*}}$$

As the set P* contains the strongest patterns and as observation $v_l$ admits more than one pattern, the solution shown to satisfy conditions (a) to (g) also covers condition (h) as such a pattern is the least possible strong pattern since it covers the minimum number of observations possible. Consequently, MILP-h admits at least one solution that qualifies as a pattern.

Theorem 2.

If (w,y,d) is a feasible solution of MILP-h, then the resulting pattern p* is the strongest possible pattern which degree is d.

Proof.

This proof is similar to what was demonstrated in Ryoo et al. for equation (2). As the objective function of the MILP-h model minimizes the sum $\Sigma_{v_i \in S^*} y_i$, the optimal solution to the MILP-h model ultimately tries to minimize the number of observations in S* that are not covered by the constructed pattern. As a result, an optimal solution to MILP-h is the strongest pattern that does not exist in the set P* of already found patterns.

Following is an example of the improvement of the iteration scheme of the present tool and method used for looping the MILP-h model:

```
begin
    P+ = ∅
    P- = ∅
    C+: c_i = 0  ∀ i ∈ S+
    C-: c_i = 0  ∀ i ∈ S-
    while S+ ≠ ∅ do
        Formulate and Solve MILP - h
        Form p+ using (3)
        P+ ← P+ ∪ {p+}
        Update Vector C+
        S+ ← S+\{i ∈ S+: c_i = l}
        Update MILP - h Constraints
    end While
    while S- ≠ ∅ do
        Formulate and Solve MILP - h
        Form p- using (3)
        P- ← P- ∪ {p-}
        Update Vector C-
        S- ← S-\{i ∈ S-: c_i = l}
        Update MILP - h Constraints
    end While
end
```

A preset constant value l, also called a discriminatory factor, represents a minimum number of patterns that each observation in the training data set must be covered by. Vectors C+ and C- are, respectively, of equal dimension to a total number of positive and negative observations in the training data set.

In training a LAD classifier using the MILP-h, it is possible to alter the discriminating power of the resulting classifier by modifying the value of the constant l. A larger value of l leads to more patterns covering a single observation in the training set, thus increases the discriminating power, however, at the expense of increased computation time.

The improvements previously introduced are based on the strong pattern generation MILP model proposed in Ryoo et al, but the present tool and method are not limited to the MILP model. The improvements previously introduced also apply to other Mixed Integer Linear Programming models for generating strong prime and strong spanned patterns.

LAD Training Phase: Modified MILP Algorithm

The model shown in equation (2) is capable of generating a single pattern from the training data set. Ryoo et al. further suggests a scheme that loops equation (2) as many times as necessary until all the elements of the training data set are covered by a pattern. This however is inconvenient for three reasons: 1.) In cases where access to data is scarce, the amount of elements (observations) that can be used in training a classifier can be very small. A small training data set leads to the generation of a very small number of patterns. The classifier resulting from this small number of patterns sometimes lacks the generalization power that other classifiers possess. 2.) For applications such as the diagnosis of power transformers using dissolved gas analysis, the explanatory power of the classifier is very important as the generated patterns give the conditions under which the machine will be faulty. The MILP models and setups developed generate the minimum amount of patterns sufficient to cover a training data set. However, a more reasonable number of patterns is needed in order to find all the conditions under which a certain defect appears in a transformer. 3.) A classifier based on a small number of patterns lacks in discriminatory power as the classification of a certain observation would be based on the presence or absence of a single or a few patterns.

LAD Training Phase: Theory Formation

The final step in LAD after the patterns are generated is the formation of a classification rule based on the patterns found. This is achieved by forming a discriminant function, composed of normalized weighted patterns, that has a score ranging between −1 and +1. Using the discriminant function, new observations from outside the training data set are consequently binarized according to the same rules created in the data binarization step and entered as input to the discriminant function for classification. Observations with a positive score are classified into class 1 (positive class) and those with a negative score are classified into class 2 (negative class). For any observation vector $u_i$, the classification rule has the following form:

$$\Delta(u_i) = \sum_{\substack{k=1 \\ p_k^+ \in P^+}}^{K} m_k^+ p_k^+(u_i) - \sum_{\substack{l=1 \\ p_l^- \in P^-}}^{L} n_l^- p_l^-(u_i)$$

The value $m_k^+ \geq 0$ ($n_l^- \geq 0$) is a normalized weight assigned to each of the K (L) positive (negative) pattern $p_k^+$ ($p_l^-$) found in the set $P^+$ ($P^-$). The weights are generally obtained by counting the number of elements a pattern covers within the training data set and dividing that amount by the total coverage of all the patterns found, to create a normalized set of positive (negative) weights such that $\Sigma_{k=1}^K m_k^+ = 1$ ($\Sigma_{k=1}^K m_k^+ = 1$). An observation $u_i$ which expresses a certain pattern $p^*$ has $p^*(u_i) = 1$ and 0 otherwise.

LAD Testing: Training

A training set composed of N observations divided among K classes $c_i, i \in (1, 2, \ldots, K)$ is used. The LAD algorithm starts by setting two parameters:

minPosCovRate, defined as a minimum prevalence that a pattern p can have over a certain class $c_i$ so that p can be considered a positive pattern for $c_i$.

maxNegCovRate, defined as a maximum prevalence that a pattern p can have over a certain class $c_i$ so that p can be considered a negative pattern for $c_i$.

These parameters are needed to calculate the weights of the patterns created for each of the classes in the training set. An empty set $\mathcal{P}$ is also created to contain all the patterns generated from this algorithm.

From the K classes a set of all possible class pairs $C_{ij}, i, j \in \{1, 2, \ldots, K; i \neq j\}$ where $C_{ij} \neq C_{ji}$ is created. For each class pair $C_{ij}$ the set of patterns $P_{ij}$ is created that separate class i from class j. If the homogeneity constrain is set to 0, then the patterns in the set $P_{ij}$ cover at least one observation of class i and non of class j. Otherwise, the generated patterns cover a specific percentage of observations of class j. The method used to generate a pattern in $P_{ij}$ is discussed in more detail below.

Each pattern found in $P_{ij}$ is tested for redundancy in the set $\mathcal{P}$ of all patterns. If the generated pattern is found to be unique, then it is added to $\mathcal{P}$. The end result is a set of patterns $\mathcal{P} \{p_1, p_1, \ldots, p_R\}$ where R is the total number of unique patterns generated from all the class pairs $C_{ij}$.

For each of the patterns $p_r, i \in \{1, 2, \ldots, R\}$, a K×K matrix is calculated where by the weight that reflects the ability of $p_i$ to separate two classes i and j is calculated for each class pair. The diagonal of the matrix is set to zeros as there is no meaning in separating the same class. The matrix for a pattern $p_r$ has the following form:

$$W_{Pr} = \begin{bmatrix} 0 & a_{12} & \ldots & a_{1K} \\ a_{21} & 0 & \ldots & a_{2K} \\ \vdots & \vdots & \ddots & \vdots \\ a_{K1} & a_{K2} & \ldots & 0 \end{bmatrix}$$

An element $\alpha_{ij}$ of the above matrix is calculated based on a coverage rate (prevalence) of pattern $p_r$ to the two classes $c_i$ and $c_j$ and the parameters determined at the start of the LAD algorithm. The prevalence of pattern $p_r$ over a certain class $c_i$ is calculated as follows:

$$V(p_r, c_i) = \frac{\sum_{y=1}^{y=N_{c_i}} p(x_{y,c_i})}{N_{c_i}}$$

where $N_{c_i}$ is a number of observations belonging to class $c_i$ in the training set and $p(x_{y,c_i})$ is 1 if $p_r$ covers observation $x_y, y \in \{1, 2, \ldots, N_{c_i}\}$ and 0 otherwise.

The rules for determining $\alpha_{ij}$ are as follows.

$$a_{ij} = \begin{cases} V(p_r, c_i) & \text{if } V(p_r, c_i) \geq minPosCovRate, V(p_r, c_j) \geq maxNegCovRate \\ -V(p_r, c_j) & \text{if } V(p_r, c_i) \leq maxNegCovRate, V(p_r, c_j) \geq minPosCovRate \\ 0 & \text{if Otherwise} \end{cases}$$

From the K×K matrix for each pattern $p_r$, the class weights of the pattern are calculated. The class weight $w_{c_i}$ of pattern $p_r$ is calculated by adding the elements of row i in the $p_r$ K×K matrix as follows:

$$w_{c_i, p_r} = a_{i1} + a_{i2} + \ldots + a_{iK}$$

As a result, each pattern $p_r$ has a vector of class weights $$(w_{c_1, p_r}, w_{c_2, p_r}, \ldots, w_{c_k, p_r}).$$

LAD Testing: Calculating Class Scores and Classification

The classification of a given observation is done by calculating a score for this observation in each class and choosing the class that obtains the highest score. The score $D_i$ for a given observation in class $c_i$ is calculated as follows:

$$D_i = w_{c_i, p_1} + w_{c_i, p_2} + \ldots + w_{c_i, p_R}$$

Consequently, for each observation, K scores, $D_1, D_2, \ldots, D_K$, are calculated. The observation belongs to the class with the highest score $D_i$.

LAD Testing: Generating a Single Pattern

As mentioned above, a subset of patterns $P_{ij}$ for every two classes i and j. These patterns have the property that they cover at least one observation from class i and no observations of class j (if the homogeneity constrain is set to zero). The pattern generation algorithm used here is found in Ryoo et al. It generates a strong pattern from a set of 2 classes using linear programming.

For the sake of illustrating this algorithm, a Boolean vector $v(v_1, v_2, \ldots, v_{2q})$ of size n is introduced. n value is double that of a binary observation vector of the truth table, i.e. n=2q. The elements $v_1, v_2, \ldots, v_q$ are relative to the literals $x_1, x_2, \ldots, x_n$ respectively such that if $v_j=1$ then the literal $x_j$ is in included in pattern p. Similarly, the elements $v_{q+1}, v_{q+2}, \ldots, v_{2q}$ are relative to literals $\bar{x}_1, \bar{x}_2, \ldots, \bar{x}_n$ respectively such that if $v_{q+j}=1$ then literal $\bar{x}_j$ is included in pattern p. Naturally, a pattern cannot include both the literal $x_j$ and its negation $\bar{x}_j$ at the same time. For that reason the condition $v_j + v_{q+j} \leq 1$ stands.

Each positive observation vector $p_i(b_1, b_2, \ldots, b_q) \in S^+$ is associated with the Boolean vector $\alpha_i(\alpha_{(i,1)}, \alpha_{(i,2)}, \ldots, \alpha_{(i,q)}, \alpha_{(i,q)}, \alpha_{(i,q+2)}, \ldots, \alpha_{(i,2q)})$ such that $\alpha_{(i,j)}=1$ (j=1, 2, \ldots, q) if $p_i(b_j)=1$ and $\alpha_{(i,q+j)}=1$ (j=1, 2, \ldots, q) if $p_i(b_j)=0$. The same condition of mutual exclusivity holds for $\alpha_{(i,q)}$ and $\alpha_{(i,q+j)}$ where both cannot be 1 at the same time.

As a result, a positive pattern $\mathcal{P}^+$ is associated with its corresponding vector $v(v_1, v_2, \ldots, v_{2q})$. Similarly, a positive observation $p_i$ is associated with its corresponding vector $\alpha_i$.

LAD Prognostics

LAD as a prognostic technique is based on separating the positive patterns found into 2 or more sets. The sets are identified as high risk, medium risk and low risk patterns. If an observation is classified as negative, it is tested for the presence of high, medium or low risk patterns. The existence of such patterns indicates whether the device from which the observation is taken is at high, medium or low risk.

LAD Unsupervised Learning

Since LAD is a supervised learning technique, an unsupervised learning version is introduced. It is based on adding to the traditional LAD an expert system that is used to classify the training set of data. Once the data is classified, LAD is used to train the computer system and then to test new data. An application is herein below provided.

Example 1

To demonstrate the performance of LAD in the diagnosis of faults in transformers, two configurations of multilayer LAD classifiers were set and test were performed on these configurations on two sets of data obtained from other sources. The chosen configurations are similar to those setup for the other sources so as to compare the results obtained from the multilayer LAD classifier with those obtained using other techniques.

Databases

Database 1: Composed of 117 samples of defective transformers compiled from different sources. Each sample is composed of the content of 5 gases (H2, CH4, C2H6, C2H4 and C2H2) along with CO and $CO_2$ gas content in addition to know fault states of the sample as diagnosed by industry experts using diagnostic engineering tools. In total 5 fault states are identified as per the IEC standards mentioned in section I. Of the 117 samples, 9 samples are identified as PD, 26 as D1, 48 as D2, 16 as T1/T2, and 18 as T3.

Database 2: The second database describes historical samples of the 5 gases (H2, CH4, C2H6, C2H4 and C2H2), obtained from a 500 kV transformer located in a substation of the South China Electric Power Company. From a total of 75 samples in the database, 9 are reported to be normal, 38 suffer from thermal heating, 21 are faulty due to high energy discharge, and 7 due to low energy discharge.

Data Processing Techniques

The databases described above contain observations of the content levels of the 5 gases (H2, CH4, C2H6, C2H4 and C2H2). Before using this data to train and test the classifier, they are first processed by extracting new numerical features from the 5 gas content values. Four processing methods were used to extract 4 distinct processed data sets from each database. The first processing method extracts the 4 Dornenburg ratios from the 5 characteristic gases. The second processing method extracts the Rogers ratios. The third case combines the 5 unique Dornenburg and Rogers ratios. The last processing method calculates the relative content of the five characteristic gases in addition to the absolute information of each observation. The data sets obtained from the 4 processing techniques described above is composed of four, three, five, and six numerical features respectively. FIG. 14 shows the numerical features obtained from each processing technique. Each processing method used results in a data set composed of a different set of numerical features. The table above shows the numerical features $y_i$ resulting from each processing method. $c_i$ in the Absolute Content method represents the absolute gas content of one of the five characteristics gases were i=1, 2, . . . , 5.

Multilayer LAD Configurations

Two configurations of multilayer LAD classifiers are tested each using one of the data sets described above.

Figure 15:
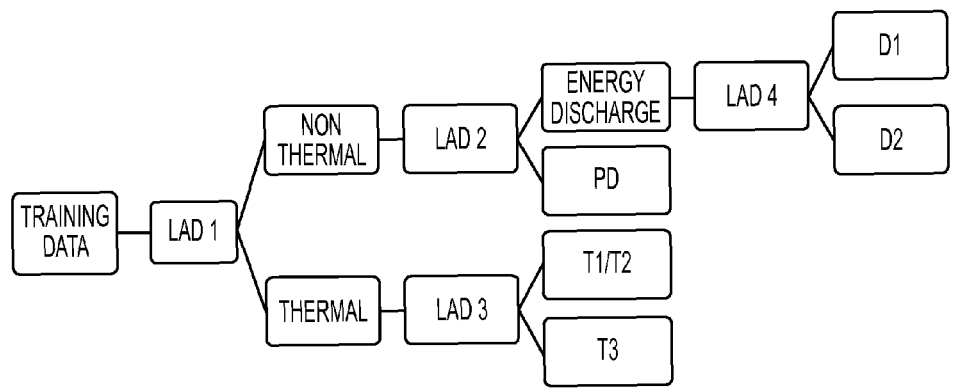
FIG. 15 is a diagram showing multilayer LAD classifiers for configuration 1 of example 1.

Configuration 1: Four LAD classifiers are placed in cascade and trained using database 1. The first classifier is trained to separate thermal defect observations from non-thermal ones. The second classifier is trained to separate the non thermal defects into partial discharge defects (PD) and energy discharge defects. The third classifier is trained to classify thermal defects into high temperature (T3) ad low temperature (T1/T2) defects. Finally, classifier four separates energy defect observations into high energy (D1) discharge and low energy discharge (D2) defects. As a result the global classification scheme performs fault identification by separating observations into the 5 fault types described in the IEC standard. This configuration, shown in FIG. 15, is similar to another configuration where a neural fuzzy classifier was used on data set 1 to identify the 5 IEC transformer fault types.

Figure 16:
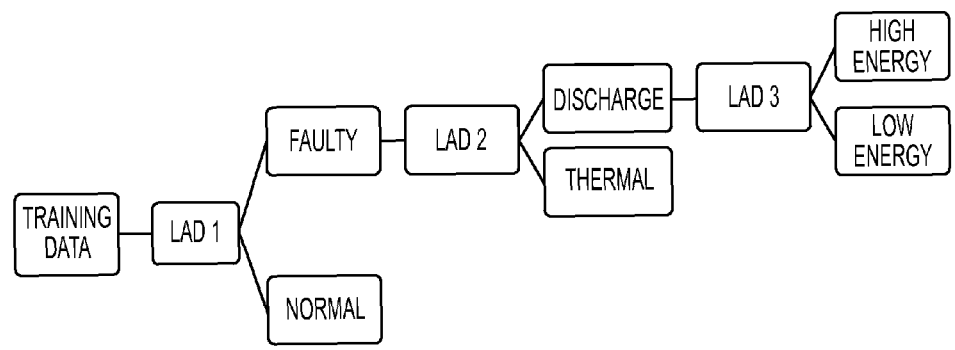
FIG. 16 is a diagram showing multilayer LAD classifiers for configuration 2 of example 1.

Configuration 2: Three LAD classifiers are placed in cascade and trained using database 2 as shown on FIG. 16. The first classifier is trained to separate normal observations from faulty ones. The second classifier is trained to separate thermal heating defects from energy discharge defects. Finally, the third classifier is trained to classify high energy discharge and low energy discharge defects. The final classification scheme performs fault detection and fault identification. Normal data is separated from faulty data, which is in turn classified into 3 fault types: Thermal, High Energy Discharge, and Low Energy Discharge defect. This configuration, is shown in the following diagram, and represents a multilayer SVM classification scheme is tested on data set 2 described above and compared with ANN, FL, expert system (ES), and ANN/ES based classifiers.

The LAD based classifiers were implemented in VS2008 C++ programming language using the LP_Solve C++ library [37]. The software, called cbmLAD, takes as input training data in the form of tables written in excel or text files and generates the pattern and discriminant function automatically. Testing data is entered in a similar way. The output is a text file containing the classification result for each element in the data set.

EXPERIMENTAL RESULTS

Experiment 1

In this experiment, configuration 1 was used on database 1. As described above, the data was processed in four different ways to produce 4 distinct data sets. Of the 117 samples 87 were picked randomly to train the multilayer LAD classifier. The remaining 30 samples were used for testing. Four runs of training and testing were performed on each of the four processed data set. On each run the discriminatory factor 1 was changed to 1, 5, 10, or 20. Consequently, 16 results were obtained from this configuration. The accuracy results of this experiment are shown on FIG. 17. Each classifier is obtained using one of four processed versions of data set 1. For each processed data set, four classifiers are trained and tested by varying the discriminatory factor l.

Figures 17, 18, 19:
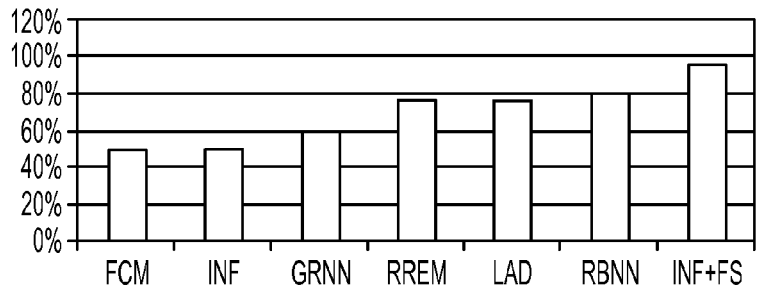
FIG. 17 is a table showing experimental results of experiment 1.
FIG. 18 is a table documenting a breakdown of the number of correctly classified observations for each fault type for the four classifiers trained at l=20.
FIG. 19 is a graph comparing the classification accuracy level obtained using different methods of classifications.

The results of FIG. 17 show that the level of accuracy increases by increasing the discriminatory factor l. The accuracy levels obtained using Dornenburg ratio data set are highest for all levels of l. FIG. 18 shows that, for most classifiers the hardest defect state to identify is the thermal faults above 700° C. (T3). For the Dornenburg ratio data set, this can be justified by the fact that the Dornenburg expert designed ratios were not intended for detecting difference between high temperature and low temperature thermal faults. If the split between high temperature fault state (T1/T2) and low temperature fault state (T3) is disregarded, the accuracy level of the best classifier would jump to 90%.

Turning now to FIG. 19, there is depicted a graph which gives a comparison between the classification accuracy level obtained using the best LAD based classifier and those obtained using Rogers Ratio Expert Method (RREM), Fuzzy C-means method (FCM), Generalized Regression Neural Network method (GRNN), Fuzzy Clustering and Radial Basis Function Neural Network (RBF), and the Integrated Neural Fuzzy Approach with feature selection (INF+FS) and without (INF). It should be noted here that despite the fact that the data source is the same for all the classifiers being compared, different data processing techniques were applied in most cases. The comparison shows that the LAD based classifier fairs well in relation to the conventional classification methods. The highest accuracy among all the compared methods is the Integrated Neural Fuzzy Approach combined with a competitive learning feature selection technique to process the data before classification.

In the case of this experiment, the total amount of training time ranged between 1 and 15 seconds on an ordinary computer depending on the level of l and type of data set used.

Experiment 2

Figures 20, 21, 22:
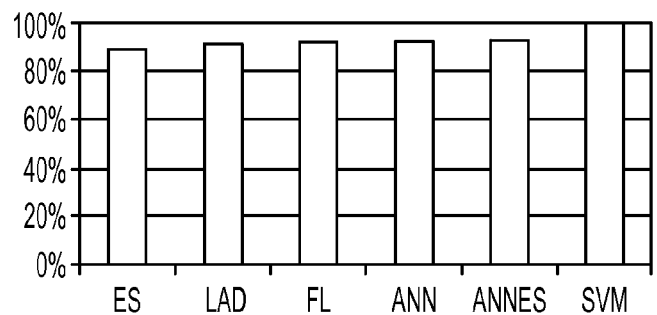
FIG. 20 displays the results of the classification of experiment 2.
FIG. 21 is a graph showing the result of the comparison of multilayer LAD with classifiers based on various methods obtained in experiment 2.
FIG. 22 is a table showing training time for Multilayer LAD and SVM based classifiers is lowest while ANN based techniques take the most time in the context of experiment 2.

For this experiment, the 3 layer cascaded classifier, labeled as configuration 2 above, was trained and tested using data sets obtained from database 2. The data was processed using the four techniques described earlier in order to produce 4 distinct data sets. 50 samples were used for training the multilayer LAD classifier and 25 samples were used for testing, 4 of which are normal, 13 defective due to thermal heating, 2 defective due to high energy discharge and 6 due to low energy discharge. Before using the testing data, white noise at 5% was added to compensate for the small size of the set. The LAD based classifiers were trained at l=1, 5, 10, and 20 to investigate the effect of the modifications to the algorithm. FIG. 20 displays the results of the classification in each case. As with experiment 1, the diagnosis accuracy increased with the increase in the discriminatory factor l for every data set type. The best classification accuracy, 92%, was obtained using the absolute content data at l=20.

As with experiment 1, the multilayer LAD classifier accuracy was compared to the accuracies obtained using other classification techniques. FIG. 21 shows the result of the comparison of multilayer LAD with classifiers based on neural networks (ANN), expert systems (ES), fuzzy logic (FL), neural expert systems (ANNES), and support vector machines (SVM). The result of the comparison shows that multilayer LAD gives a comparable performance to most of the techniques mentioned above, with SVM standing out as the best performer. FIG. 22 shows a comparison of the training times of the classifiers when the same size training set is used. Multilayer LAD and SVM outperformed the remaining classification techniques with a training time of around 1 second.

Pattern Interpretability

In comparing the LAD based classifiers, we realize that LAD has given similar accuracy levels to ANN, Expert System (ES), and Fuzzy Logic (FL) classifiers among others but was outperformed by methods such as SVM. However, LAD possesses the advantage of result interpretability which the most other classifiers cannot provide. The patterns generated by LAD can be translated to rules similar to those used in expert systems. To illustrate this advantage, the two patterns generated from the second layer of the $2^{nd}$ configuration LAD classifier using Absolute content input data and at l=1 are used and results shown in FIG. 23. These two patterns combined cover the 20 samples that are defective due to an energy discharge and none of the 25 samples that are defective due to thermal heating.

Each of the two patterns above covers 85% of the 20 samples from which they are extracted. When transformed into meaningful rules, pattern 2 states that faulty transformers that have a relative content of gas $C_2H_2$ that is greater than 0.16 appears always to be defective due to energy discharge and never due to thermal heating. This rule is similar to the rules that make up the Rogers Ratio method. FIG. 24 shows the rules used for diagnosing a machine using the Rogers ratio Method. By using the same types of features for training the multilayer LAD classifier, we a more elaborate set of rules that can classify faults into the five IEC defect types was generated. 10 rules obtained from the patterns collected at each layer of the 1st configuration multilayer LAD classifier using the Rogers ratio data set at l=20 are shown in FIGS. 25-28.

The information obtained from these rules is valuable for the technician on the ground as well as for the engineers working on developing and improving the performance of the transformer. Therefore the slightly lower accuracy rate that LAD suffers from in comparison to SVM is compensated by a gain in knowledge from the interpretation of the patterns generated by LAD.

Example Power Transformer (1)

The exemplary implementation of the present tool was used to diagnose a power transformer, and more particularly a transformer's oil condition for fault diagnosis. Degradation of the oil's condition leads to the generation of gas. This generation of gas is accelerated by the presence of structural faults in the transformer. Dissolved gas analysis (DGA) is then used to detect those faults. Five indicators $x_i$, i=1, . . . , 5 were measured. These measurements were numerical values. Fault detection was performed using Multilayered LAD. The early version of the software cbmLAD, corresponding to an aspect of the present tool that was used to detect faulty state based on the LAD methodology could handle only two states. For that reason, monitoring and diagnosis was divided into three different aspects. In each aspect, the negative state corresponded to the normal state, and the positive state referred to thermal heating, high energy, and low energy, respectively. The following description presents results of the detection of the faulty state caused by the high energy. However, the two other faulty states could be treated in the same manner. The latest version of cbmLAD can now handle multi-class classification.

The binarization process used provided as many binary attributes as cut points. The binarization process resulted in twenty nine, thirty nine, and thirty five binary attributes for the three problems respectively, and a binary database. In the software cbmLAD, the binarization was followed by feature reduction. Feature reduction reduces the size of the binary database by eliminating as many redundant binary attributes as possible, while preserving the basic property mentioned above. This is accomplished by solving a set covering problem. The database consisted of 15 positive observations (high energy) and 5 negative observations (normal). From this data set, 10 of the positive observations and 3 of the negative observations were used for training. The remaining 5 positive observations and 2 negative observations were used to test the decision model obtained. This procedure was repeated 150 times, each time the combination of training and testing observations were changed. The selected maximum degree of the generated patterns (MDGP) was set to 1 for the first 50 trials. The MDGP was increased to 2 for the next 50 trials and to 3 for the last batch of 50 trials. The selection of the training set was done randomly for the first 50 trials. The selections were then repeated twice in order to test the effect of increasing the MDGP on the success rate.

In order to evaluate the classification accuracy, the proportion of falsely classified observations was calculated according to FIG. 29. The values (a) and (d) represent the proportion of observations, positive and negative, which are correctly classified. The values (c) and (b) are the proportion of observations, positive and negative, which are falsely classified. The values (e) and (f) represent the proportion of observations, positive and negative, which are not classified. The quality of classification (classification accuracy) is given by v, where:

$$v = \frac{a+d}{2} + \frac{e+f}{4}$$

The results obtained indicated classification accuracies equal to 95.86%, 94.43% and 92.00%, for the MDPG equal to one, two and three respectively. These results can be explained by the fact that longer (higher degree) patterns, although more robust, tend to be less general (more conservative) and thus fewer observations may be covered by such patterns, while patterns which have lower degrees are more general, i.e. have high prevalence due to the frequency of observations covered, and also have high explicative power due to their intuitive nature. The execution time on a portable computer of 4-MCPU 2.00 GHz, 1.20 GHz, 512 MB of RAM was less than 1 second.

Example Power Transformer (2)

This particular application is presented in a publication titled 'Fault diagnosis of power transformer based on multilayer SVM classifier', by Ganyun, L., Haozhong C., Haibao Z. and Lixin D. in 2005. In this paper, the authors used a transformer's oil condition for fault diagnosis of a power transformer. The degradation of the oil's condition lead to the generation of gas. This process was accelerated by the presence of structural faults in the transformer. Dissolved gas analysis (DGA) was used to detect those faults. Five indicators were measured. These were numerical values. The authors used the Support Vector Machine (SVM) technique for fault detection.

The present tool and method use the experimental data presented by Ganyun et al., for fault classification using Multilayered LAD. The original data show four classes of faults: the normal state, thermal heating, high energy discharge, and low energy discharge. The database consists of seventy five observations. Fifty observations are used for learning, and twenty five for testing. The learning set L contains twenty five observations of thermal heating, fifteen observations of high energy, five observations of low energy, and five observations of normal state. The testing set T contains thirteen observations of thermal heating, two observations of high energy, six observations of low energy, and four observations of the normal state. For simplicity purposes, the present tool and method used two states, and the current example was divided into three different problems. In each problem, the negative state was the normal one, and the positive state was the thermal heating, the high energy, and the low energy, respectively. The present tool and method were not limited to applications having two states simultaneously, and could equally handle application with more states.

The binarization of the numerical values was achieved according to the following steps: a) The values in every column representing the measurements of an indicator x were arranged in ascending order, b) Every time the class of an observation changed from positive to negative or from negative to positive, a cut point t was introduced. and c) Every cut point was associated to a binary attribute such that $$b(x, t) = \begin{cases} 1 & \text{if } x \geq t \\ 0 & \text{if } x < t \end{cases}$$

Figure 2:
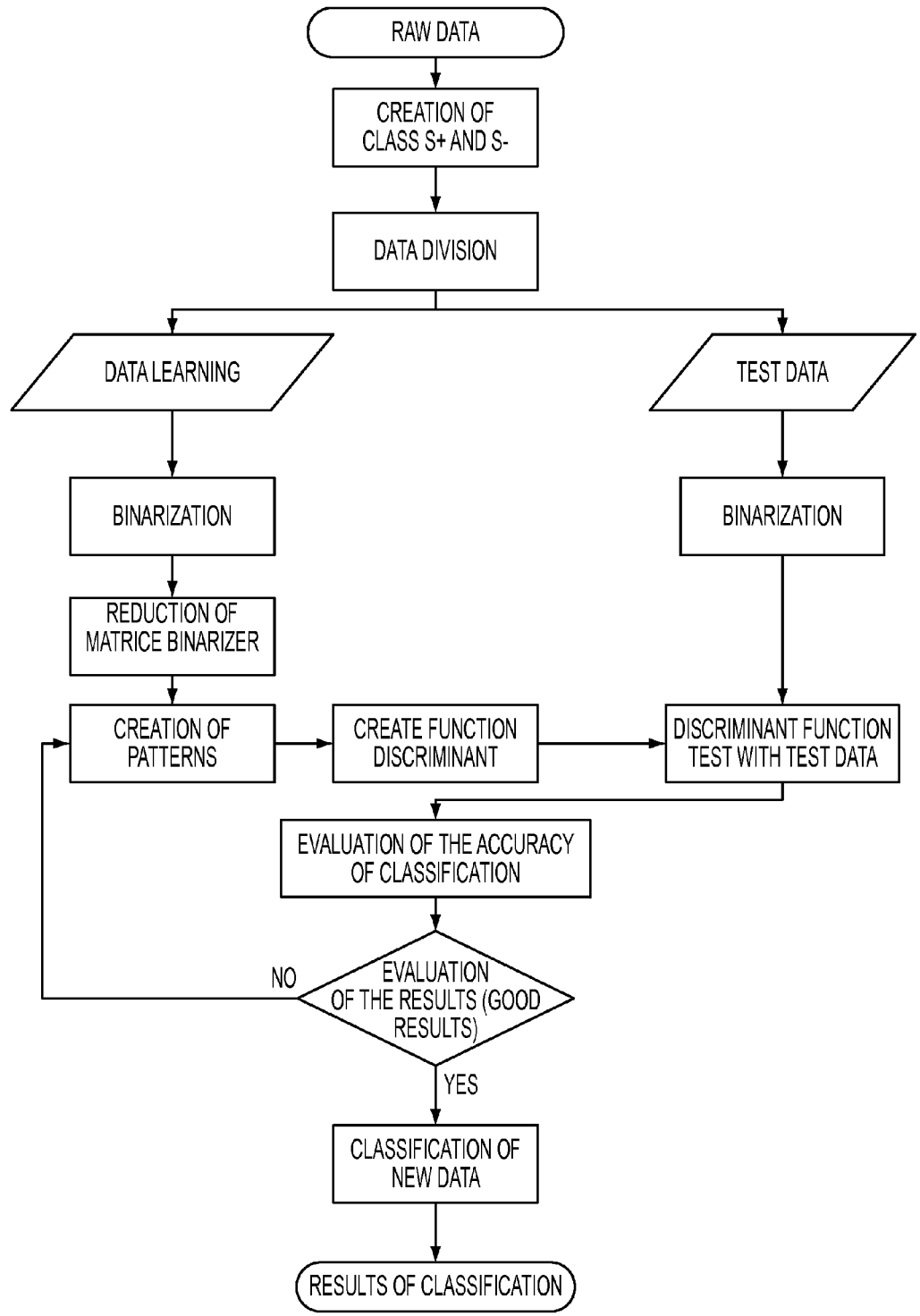
FIG. 2 is an exemplary flowchart of the present method.

There were as many binary attributes as cut points. The binarization process resulted in twenty-nine, thirty nine, and thirty five binary attributes for the three problems respectively. FIG. 2 presents a schematic description of Multilayered LAD steps. The results were obtained when the problems were solved on a computer running Windows XP™ operating system and 1024 MB of RAM with an Intel Centrino Duo™ processor operating at 2.0 GHz. A pattern of low degree was generally relatively more important than a pattern of high degree, since it usually covered more observations. For that reason, the patterns of low degree added more knowledge than the patterns of high degree, and as the degree of pattern increased, its contribution to the knowledge gained kept decreasing. For that reason, the process of pattern generation was limited in the present example to patterns of degree three.

FIGS. 3 to 10 show the results of the binarization, pattern generation, and the classification processes for the testing sets, for the three problems respectively. In these figures, the positive zone is (1, 0) and the negative zone is (−1, 0). The misclassifications are shown in grey.

In order to evaluate the performance of the present tool based on multilayered LAD, the definitions given by Abderrazak Bennane in his memoir for his Master at Ecole Polytechnique de Montréal in May 2009 were used. In these definitions, a false positive is an observation classified as faulty while it is normal. The percentage of False Positives (FP) is calculated based on the table of FIG. 30 and following and equation:

$$FP = \frac{b}{b+d+f}$$

A false negative is an observation classified as normal while it is faulty. The percentage of False Negatives (FN) is calculated as follows:

$$FN = \frac{c}{a+c+e}$$

The results show that even for a very small sample of six observations, the result is 66.66% correct prediction. The best result was obtained for the second test with all the observations correctly classified, and the third test results give 0% false alarm and 82.36% correct predictions. Since these results were not conclusive, the third test was repeated one hundred times with different permutations of the data. The results gave approximately 84.13% correct predictions. The results published by Ender Boros and Peter L. Hammer in 'An Implementation of Logical Analysis of Data' in the IEEE Transactions on Knowledge and Data Engineering in the issue of March/April 2000 reported an average of approximately 86.76% correct predictions for LAD, and an average of approximately 86.18% for the best reported results with techniques other than LAD. These figures depended on many factors, mainly the size of the database, the quality of data, the proportion of the size of the learning set to the size of the testing set, the rule used in defining the decision zones, the quality of the software and consequently the quality of the generated patterns.

Figure 11:
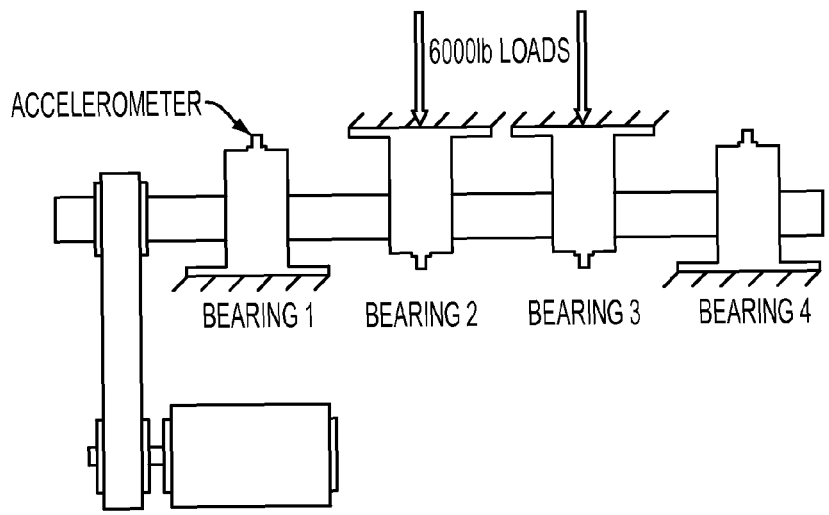
FIG. 11 is a schematic diagram of a test rig used to perform experiment 3.

Example 4: Fault Detection and Prognosis of Rotating Machinery Using Vibration Signals FIG. 11 shows a schematic representation of a test rig The present tool, and more particularly the multilayered LAD was tested on a database of signals obtained from the National Science Foundation Industry/University Cooperative Research Center on Intelligent Maintenance Systems (IMS) through the NASA prognostic data repository. The rig was composed of a motor running at a constant speed of 2000 rpm coupled to a shaft carrying 4 identical bearings, 2 of which were under a constant load of 6000 lb. Accelerometers of type PCB 353B33 High Sensitivity Quartz ICP® were placed on each of the four bearing housings. The 4 identical bearings on the shaft were Rexnord ZA-2115 double row bearings with 16 rollers in each row, 2.815 inch pitch diameter, 0.331 inch roller diameter, and a tapered contact angle of 15.17°. All the bearings on the shaft were in "brand new" state.

The present tool and method were used with a multilayered LAD to detect faults in the bearings days before the actual catastrophic failure occurred. In order to test the performance of the present tool, the signals collected from bearings 3 and 4 were used in the test rig due to the fact that their faultiness had been confirmed visually at the end of the test run time period. However, in order to train the multilayered LAD and, later-on, test its performance using the database of signals from bearings 3 and 4, the signals collected from these bearings over the entire 35 day period into normal and faulty signals were separated by relying on visual inspection of some features.

As a first measure, kurtosis values of all 2156 signals were plotted for both bearings 3 and 4. A close examination of these graphs reveals abnormalities starting on day 32 for bearing 3 and day 20 for bearing 4. As kurtosis by itself is not enough to confirm the existence of a fault, this evidence was corroborated with further analysis of signals taken from both bearings.

Figure 12:
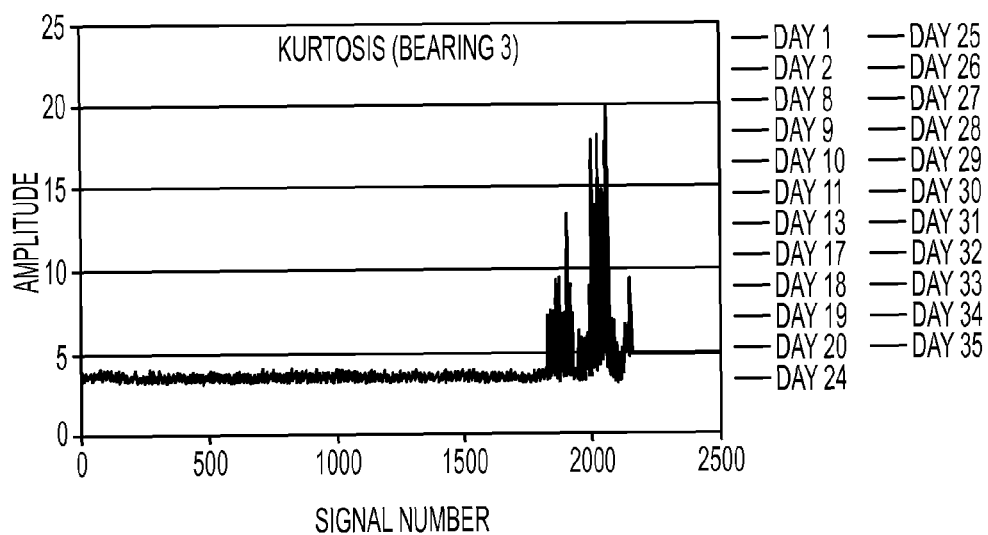
FIG. 12 is a graph showing Daubechies Wavelet Transform (DWT) of signal 2120 of bearing 3 obtained through MATLAB™.

In FIG. 12, the kurtosis plot for signals obtained from bearing 3 over 35 days of testing suggest that the defect started on day 32 of operation, with the kurtosis levels beginning to surge in signals acquired during that time. The kurtosis values calculated through MATLAB™ were plotted using Excel™.

In order to test the effectiveness of the multilayered LAD approach, the state of bearings 3 and 4 was diagnosed as either defective or normal using the signal databases collected for each bearing. To do so, the signal database of each bearing was divided into training data sets and testing data sets.

The database of 2156 signals for bearing 3 was divided in different ways to 5 different data sets composed each of a training set and a testing set. The sizes of the sets and their composition are displayed in FIG. 31. The purpose behind the 5 different sets is to study the effect of different training set sizes on the performance of the diagnostic tool. The selection of the 5 training sets in the data sets was done by selecting every $40^{th}$, $50^{th}$, $60^{th}$, $75^{th}$, and $85^{th}$ signal from the database for each set. This was done in order to obtain a training set containing signals collected at all the lifetime stages of the bearing. Similarly, the signal database of bearing 4 is divided in 5 different ways into 5 data sets, whose composition is shown in FIG. 32.

A MATLAB™ tool was created to pre-process the data using the feature extraction techniques previously described. The present tool created two pre-processed versions of each data set: one containing time-frequency features exclusively and another containing both time and time-frequency features. The reason for doing so was to test whether the wavelet based time-frequency features were sufficient for detecting faults alone.

The MATLAB™ tool extracted 12 time-frequency domain features using the discrete wavelet transform with the Daubechies db8 mother wavelet at a scale range of 12. The Daubechies mother wavelet was chosen because of the orthogonality requirement of DWT. The scale of 12 was chosen so that the frequency ranges that each energy scale represented were detailed enough to be sensitive to defect frequencies. FIG. 12 shows the DWT of signal 2120 of bearing 3 obtained through MATLAB™.

As a result, the MATLAB™ pre-processing tool extracted from each of the 10 data sets described above, 2 versions of the training set and testing set. The first version was composed of the 12 wavelet based features alone while the second version was composed of 18 features which included the wavelet based features as well as the 6 time domain features.

Each of the data sets shown FIGS. 31 and 32 were used in different ways to train and test the present tool, and more particularly the multilayered LAD based diagnostic software. The variables in each case were the type of feature set used and the user defined parameter k. Two types of features sets were used on each data set so as to obtain 2 training and testing sets, one including all 18 time and wavelet based features and one including the 12 wavelet based features exclusively. For each training and testing set the parameter k was varied six times to take the values: 1, 10, 25, 50, 75, and 100.

To assess the performance of the diagnosis resulting from each trained model, the following statistics were calculated: accuracy, true positive rate, true negative rate, false positive rate, false negative rate, and the quality of classification. The term positive referred to the detection of a defect (positive diagnosis) and negative referred to a normally function bearing (negative diagnosis). The accuracy measure gave the total amount of correct classifications irrespective of the separate accuracy of normal and defective signal detection:

$$\text{Accuracy} = \frac{A+B}{N}$$

where A was a total number of correctly diagnosed positive (defective) signals, B was a total number of correctly diagnosed negative (normal) signals, and N was a total number of signals in the testing set. Quality of Classification, on the other hand gave an assessment of the decision model based on the following formula:

$$v = \frac{a+d}{2} + \frac{e+f}{4}$$

where α was a true positive rate, b was a true negative rate, c was a false positive rate, d was a false negative rate, and e and f were respective proportions of non-classified positive and negative signals in the testing set.

The results for the 5 data sets of bearing 3 are shown in FIGS. 33 to 37. These Figures reveal a maximum accuracy ranging between 95.2% and 97.5% for each data set. In 9 out of 10 cases the accuracy levels increased with an increase in k. This demonstrates that the present tool using the multilayered LAD based decision model results increased accuracy 90% of the time. In 6 out of 9 cases the accuracy reached a maximum at a certain k value before decreasing again. This can be explained by the phenomenon that, after an ideal number of generated patterns is reached, all additional patterns generated may be too specific to certain observations in the training set and play a counterproductive role. This suggests that there is an ideal value of k for each data set at which maximum accuracy can be attained.

The training time for the decision models increased with the increase in k and for larger training sets. The longest recorded training time was 57 seconds while the shortest was less than one second long. An important statistic for monitoring the performance of the diagnosis is the true positive rate which reflects the ability of the diagnostic tool to detect the defective vibration signals. The highest true positive rate achieved was 96.7%, obtained using training set 3 with all 18 features and at k=25. It can be argued that the best classification result was obtained using data sets 3 and 4, from which the highest average classification quality levels per data set were obtained at 94.8% and 95.8% compared to 84.5%, 89.1%, and 83.3% for sets 1, 2, and 5 respectively. The best overall decision model was obtained using data set 3 at k=10 using the "all features" feature set type with the highest classification accuracy of 97.5% and a high classification quality of 96.9%.

The results for the 5 data sets of bearing 4 are shown in tables 8 to 12. These tables reveal a maximum accuracy ranging between 97.1% and 98.9% for each data set. Similarly to bearing 3 data sets, the accuracy levels increased with an increase in k in 80% of the cases. This proves once again the effectiveness of the modified LAD based decision model compared to the original approach. As with bearing 3, the accuracy reached a maximum at a certain k value before decreasing again in 8 out of the 9 cases where accuracy increased with k. The interpretation of this phenomenon has been discussed above.

The training time for the decision models increased with the increase in k and for larger training sets. The longest recorded training time was 67 seconds while shortest was less than one second long. The highest true positive rate achieved was 100%, obtained using training set 5. A 100% classification result means that 100% of defective signals in the test set were correctly identified. The best overall decision model was obtained using data set 1 at k=25 using the "all features" feature set type with the highest classification accuracy of 98.9% and an equally high classification quality of 98.8%.

The overall results obtained from bearing 4 data sets are better than those obtained from bearing 3 in terms of both accuracy and classification quality. This can be explained by the fact that the data sets of bearing 3 contained signals, recorded after the catastrophic failure of the bearing had occurred, that had been identified as defective signals during the training and testing process. Such signals no longer possess the properties of defective signals and may have, as such, misled the decision model in some minor cases.

The results obtained from both bearing 3 and 4 data set suggest that there is no direct connection between the size of the training data set used and the accuracy and quality of the decision model obtained from it. This is supported by the fact that the best decision models in both cases were not obtained from the $5^{th}$ and largest data set. However, as the data sets used were distinct from each other in terms of their signal content and not enough data sets of the same size were used for comparison, there is no way to exclude decisively any correlation from the results obtained.

For bearing 3 data sets, the difference in maximum accuracy between the decision models trained using time and frequency features and the models trained using wavelet based features alone ranged between 0% and 3.5% with the advantage being to the models using all the features. The average classification quality achieved in each data set by each feature set type ranged between 85.4% and 95.9% when all features are used and between 83.8% and 95.8% when only wavelet features were used.

For bearing 4, the maximum accuracy per data set was obtained in 4 out of 5 cases using the feature set containing all time and wavelet based features. The difference in maximum accuracy in these cases between the decision models trained using time and frequency features and the models trained using wavelet based features alone ranged between 1.2% and 1.9%; a narrower range than that found with bearing 3 data sets. The maximum accuracy was higher using the feature set containing wavelet features only in only 1 out of 5 cases. The average classification quality achieved in each data set by each feature set type ranged between 95.4% and 97.9% when all features are used and between 91.3% and 97.4% when only wavelet features were used.

The relatively small difference in accuracy levels and average classification quality levels between those obtained using time and wavelet based features and those obtained using wavelet based features alone suggested that the use of wavelet energies alone was sufficient to achieve a good diagnosis of bearing status after training. However the use of combined time and wavelet features resulted in most cases in higher accuracy as the patterns obtained from the decision models suggested. To further illustrate this point, the patterns generated by the decision models using data set 5 of bearing 4 were studied. Thanks to the transparency of the multilayered LAD based decision modeling process, it was possible to interpret and compare the patterns generated by the decision model from that data set at k=10 using the wavelet features alone with the patterns obtained at k=10 using both time and wavelet features. FIGS. 43 and 44 show the positive (defective) patterns that were found by the two decision models described above. The classification power of the patterns found using all the features in the data set is 89.88% compared to 87.19% for those obtained using wavelet features alone. More particularly, FIG. 43 provides a list of positive (defective) patterns generated by the LAD decision model using bearing 4 data set 5 at k=10 with wavelet features only, while FIG. 44 provides a list of positive (defective) patterns generated by the LAD decision model using bearing 4's data set 5 at k=10 with all 18 features.

The patterns shown in FIGS. 43 and 44 demonstrate the advantage that multilayered LAD based decision models have over other traditional diagnostic approaches. The patterns generated form the decision rules of the model and can be interpreted in terms of the features of the data set. This property can be very helpful to technicians as it helps understand the reasons that lead to the diagnosis and facilitates further investigation of the vibration signals of the bearing in light of the decision given by the multilayered LAD and the present tool.

Since the multilayered LAD is a supervised learning technique, an unsupervised learning version is further herein introduced. It is based on adding to the multilayered LAD an expert system that is used to classify the training set of data. Once the data is classified LAD is used to train a computer system and then to test new data.

Example 5: Rogue Components—Their Effect and Control Using LAD

A rogue component is defined as an individual repairable component, which repeatedly experiences consecutive short in-service periods, manifests the same mechanical system fault each time it is installed, and when it is removed from service, the mechanical system fault is corrected.

The reason a component develops a rogue failure is because its repair and/or overhaul tests do not address 100% of the component's operating functions, characteristics or environment. Interviews with various Original Equipment Manufacturers (OEM) revealed the test coverage was typically about 85% of the component's complete functionality. Even if all the functions were covered, the operating environment of the component when it was installed in the mechanical system was usually quite different than the repair facility, so if a failure was dependent upon a particular in-service environmental condition, it was unlikely that it would be duplicated during test.

Additionally, the repair and/or overhaul tests were developed to identify anticipated failures, focused on testing things that were expected to fail. For example, it would not make sense to check all the screws or electrical ground straps each time a component came into the shop, since the chance of failure for those pieces was practically zero and the cost of performing such extensive testing during each shop visit would be exorbitant.

When a component experienced a failure that was either unaddressed or unanticipated by the testing procedures, a rogue is born. Since every test that was performed missed that specific aspect of the component's functionality, the fault would never be identified and resolved.

The rogue failure cannot be predicted if, when, and where it will occur. It is a random failure that develops and will remain until definitive action is taken to resolve it. Not every part number population will develop rogue failures. Also, when a rogue failure occurs, not all the individual components within that part number population will necessarily develop that failure. However, any part number population has the potential for individuals to develop rogue failures, regardless of how simple or complex the design and functionality.

Rogue components cannot be prevented. It is impossible to proactively anticipate a failure that could occur and develop a new test to identify it before it happens. Therefore, the only action that can be taken is reactive, which is to detect and isolate rogue component from the population they're embedded in. Once detected and isolated, their unique failure modes can be analyzed in order to develop tests to identify them in the future.

The first step in the detection of rogue components is to develop a data collection system that captures system maintenance events and tracks the installed/removed components by part and unique serial number.

By monitoring certain indicators in the data collection system, patterns that are unique to rogue components can be discovered.

Current practice in the identification of rogue components involves searching through thousands of removal records manually and detecting visually the above mentioned patterns in order to extract these outlier components. The automation of this process through an automatic decision model that classifies repairable components into two classes: (1) Rogue and (2) Non-Rogue, provides a better solution to this problem. The present tool based on multilayered LAD, as a decision model is capable of automatically generating patterns from input data, and is thus an ideal method to automate the above process.

In what follows is a description of the LAD methodology and its implementation in rogue component detection. Implementing LAD for the purpose of detecting rogue components requires the preparation of training data in the form of observation vectors before binarization can occur. These observation vectors are formed by the indicators used to monitor the component's status in CBM. The binarization step then transforms these observation vectors to Boolean observation vectors.

Figures 45, 46:
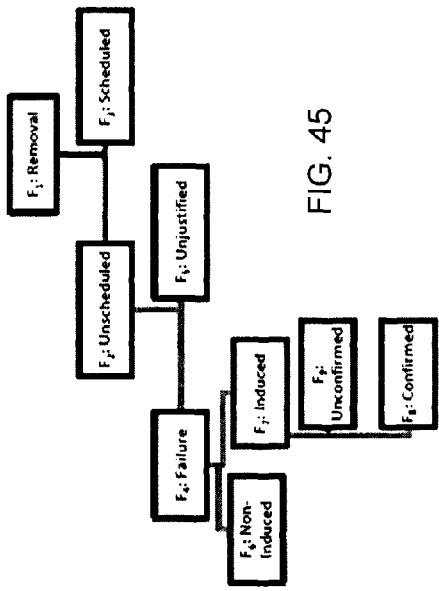
FIG. 45 is a schematic diagram representing Fault Confirmation Codes.
FIG. 46 is a table representing a portion of the non-binarized training data.

In the case of repairable components of an aircraft fleet, the indicators that form the observation vectors are extracted from the indicators in the removal records of these components. Judging from the criteria that characterize rogue components, the following indicators found in the components' removal records can be extracted and used to form the LAD observation vectors:

Fault Confirmation Codes (FCC): When a component is removed, it is taken to shop for check-up and repair. After each repair, a "Fault Confirmation Code" is added to the component's record. There are 9 possible removal confirmation codes: $F_1, F_2 \ldots$ and $F_9$. As shown in FIG. 45, these codes describe what kind of removal had occurred, whether the removal was scheduled or not, whether a failure was justified or not, whether it was induced or not, etc. . . . A combination of those codes describes the removal:

1—Reason for Removal Codes (RRC): These codes describe the cause or mode of failure of the component (e.g. leak in sealing area, wear in bearing, etc. . . . ). One component can have a mixture of reasons for removal describing the same failure incident. For a given component type, q known possible RRC codes may exist.

2—Time-to-Removal (TTR): This is the amount of time (i.e. number flight hours) the component spent in service before it was removed. This is measured as the time between installation and removal. This number is sometimes multiplied by a constant d between 0.5 and 1 that is chosen based on some known utilization characteristics of the component.

Classification within the Maintenance Process

The ability to use the indicators mentioned above depends on where, in the maintenance process, rogue component detection occurs. Implementation of the present tool with multilayered LAD can take place at one of two points in the process: before or after the component enters the repair shop.

By performing the detection before the repair stage, any unnecessary resources that may be expended on a rogue component can be saved. However, the disadvantage of detecting rogue components at this point is that Fault Confirmation Codes cannot be used as indicators. Consequently, the LAD algorithm would have to rely on the two remaining indicators to come up with a decision about the rogueness of a certain component.

Performing classification after the component undergoes repairs allows for the utilization of the FCC codes as inputs to the LAD algorithm. The presence of additional evidence leads to a more educated judgment of the components maintenance status. The disadvantage, however, is that these codes are hard to procure given the current structure of the aircraft maintenance process. In many cases aircraft component maintenance is administered by the OEMs themselves. Communication between the aircraft operator and the OEMs on maintenance matters is usually minimal. Consequently, obtaining information regarding what occurs in the repair shop may not always be possible.

It is worth mentioning that the extraction of maintenance data from an aircraft operator's logs is in many cases a tedious task. This is largely due to the fact that most maintenance data is generated for the goal of record keeping and not for utilization as an asset for the purpose of condition based maintenance.

LAD Training Table

To our knowledge, previous uses of LAD did not require taking into account historical values of the same indicator in generating the patterns and decision functions. However, in this situation, the nature of the observations from which a classification decision is obtained necessitates the incorporation of historical data into the set of LAD attributes.

Values for the 3 indicators mentioned above are recorded for every single removal instance of a single component. In the case of rogue detection, each component in the population has exhibited many removals in its lifetime. Therefore, the removal records of a certain component contain values for these indicators for every removal instance. Additionally, some components are older than others, and some have exhibited more failures than others. Therefore not all removal records contain the same amount of data.

In view of the above, it is difficult to obtain input observation vectors having a unique form if all the available information for each component is used. As such, the observation vector used to train the LAD algorithm is limited to 9 non-binary indicators representing the 3 most recent FCC, RRC, and TTR values of a component. Example: a training set of 4 rogue components and 4 non-rogue components, where each component has a recorded number of removals ranging between 3 and 9. The removal data was limited to the 3 most recent removal incidents.

The number three (i.e. the last three removals) is often used in many cases when calculating factors or triggering rogue flags. While the 3 most recent removal incidents will be used this for exemplary purposes, this number can be modified within the algorithm without any major structural change. Ultimately, the goal is to be able to consider the entire history of a certain component in the classification process.

Results

The present tool comprising multilayered LAD was implemented in software and was used on real component data obtained from the maintenance department of NetJets Inc. The data was extracted from the maintenance records of 61 airplanes during a period stretching from Mar. 28, 1999 to Jun. 20, 2009. These records consisted of 576 removal instances belonging to 150 turbo compressors. From the records of each component an observation vector was obtained. Of the available 150, 68 were used to train the LAD decision model and 74 to test the resulting model; the rest were discarded as incomplete records. The data shown in FIG. 46 show a portion of the training data. Two of the components shown in the FIG. 46 were judged as rogue by maintenance professionals. There are, in all, 13 negative observations representing normal components (grey) and 2 positive observations representing rogue components (white). Each observation represents information obtained from the removal records of one component with a unique serial number $S/N_i$. It is assumed here that the LAD algorithm was implemented before the component entered the repair shop. FCC codes were consequently absent from the table.

The 150 components did not enter into service at the same time, thus not all components exhibited 3 removals within their lifespan as most components exhibit one or two removals per 3 years for this type of part. This phenomenon may be addressed by placing close to infinity Time-to-Removal values (99999 days) and the 0 code for reason-for-removal to illustrate the absence of such events. The LAD table is then used for training the LAD algorithm and producing a decision function.

The decision model was trained 3 times, each time with a different maximum allowable pattern degree. The degrees used were 2, 3, and 4. The resulting 3 decision models were tested in each case using the data set composed of 74 observations reserved for that purpose. The value $\tau$ was randomly set to 0.2 for all three decision models. The number of binary attributes obtained and the number of positive and negative patterns found for each decision model are shown in FIG. 47.

The values of the discriminant function $\Delta$ for the 15 observations shown in FIG. 47 are presented in FIG. 48 for the 3 decision models obtained. FIG. 48 shows that the score of the discriminant function is positive for the positive observations and negative for negative observations.

The results, part of which is shown FIG. 48, reveal that the detection has been done successfully. The scores of the discriminant function for all the observations of the testing set give a negative value for the normal (non-rogue) components and a positive value for rogue components. However, since the threshold for considering an observation unclassified is ±0.2, the result was not 100% successful for all pattern decision models.

FIG. 49 shows that the results that the 3 decision models obtained had a high classification quality Q. The classification quality increased significantly with the increase in maximum pattern size from 2 to 3 bits. Degree 3 and degree 4 showed an equal performance. Additionally, all three models resulted in zero false alarms; i.e. no rogue components were misclassified as non-rogue and vice versa. The true positive and true negative values also increased with the increase in maximum patterns size from 2 to 3. However, these values change if the threshold $\tau$ is changed from the set value of ±0.2. If $\tau$ is decreased, for example, the number of false alarms increases and the quality of classification measure changes.

In comparing the discriminant function values obtained from the models with maximum pattern degrees 2, 3, and 4, the scores for the positive observations increased in the degree 3 model and then decreased slightly for the degree 4 model. The rise in the values of $\Delta$ is explained by the fact that a much higher number of positive patterns was found in the degree 3 model (274) compared to the degree 2 model (7). The scores, however, decreased slightly again in the degree 4 model even though the number of positive patterns found increased to 330. This decrease is attributed to the fact that the third model generated degree 4 positive and negative patterns which were too specific, thus leading to a decrease in the discriminatory power of Δ, as a higher degree pattern has a lower chance of covering an observation than a lower degree one. In addition, judging from the rogue component characteristics discovered manually by experts, any pattern must relate 3 consecutive events to each other. Degree 3 patterns therefore are more meaningful than patterns of the other degrees.

The advantage of the decision models obtained through LAD, besides their accuracy, is the interpretability of the decisions obtained from it. For example, one negative pattern found in the second decision model (degree 3) is: $b_{14}b_{18}b_{22}$. This pattern translates verbally to the statement: "The three last reason for removal codes are all of value 2".

Such a pattern is exactly what we would expect to have given the characteristics for rogue components. The ability to translate the patterns leading to the decision to logical statements that could be understood by any maintenance technician is unique to the LAD technique.

Tool and Method

Reference is now made to FIG. 1, which is a schematic overview of the functioning of the present method and tool. Raw data, corresponding to measured indicators for the device being analyzed is received, and stored in a database. Then, a binarizing module binarizes the stored measured indicators. The binarized measured indicators are then used by a machine learning data module, identified on FIG. 1 as the LAD-CBM core, for analyzing the binarized measured indicators, and by iteration, extract at least one pattern. The extracted pattern(s) are then classified in positive and negative classes by use of a discriminant function which is computed by a computer. The at least one classified extracted pattern is an intelligible and straightforward diagnosis or prognosis of a change of state of the device, eventually resulting in a fault of the device.

Reference is now made to FIG. 2 which depicts an exemplary flowchart of the present method. The method starts with receiving and storing raw data corresponding to measured indicators of the device to be diagnosed. The method classifies the measured indicators into classes, and divides the measured indicators so as to have a set of training data and a set of test data. As demonstrated in the previously discussed examples, the size of the training data set and test data set may vary, depending on the amount of data available, on the variety of the measured indicators provided, on the complexity of the device, etc.

The method then proceeds with training the machine learning data module, identified on FIG. 1 as the LAD-CBM core, corresponding to the left path on FIG. 2. Training of the machine learning module may be performed and completed before the machine learning module begins analyzing the binarized measured indicators of the test data set. Alternatively, the training of the machine learning module may be started first, and after identification of a pattern or a certain number of patters, the identified patters may be used to analyze the binarized measured indicators of the test data set concurrently.

The training phase of the method proceeds with passing the training data set to a binarization module for binarizing the measured indicators corresponding to the training data set. The binarized measured indicators of the training data set are then grouped into a binarizer matrix, which size may be reduced if required. The method continues with analyzing the binarized measured indicators of the training data set to identify at least one pattern(s). The analysis of the binarized measured indicators of the data set is performed iteratively, until a certain number of iterations has been completed, a time has lapsed, or any other condition that may be selected. A processor then applies a discriminate function to the identified pattern(s) to create a discriminating test function to be used analyzing the binarized measured indicators of the test data set.

The method the proceeds with the testing phase of the measured indicators of the test data set. The testing phase corresponds to the right arm of the workflow of FIG. 2. The testing phase of the method starts with binarizing the measured indicators corresponding to the test data set. Then, the patterns extracted in the training phase and their corresponding discriminate functions are applied to the binarized measured indicators of the test data set, to classify the binarized measured indicators of the test data set into positive and negative classes. An evaluation of the accuracy of the classification is then performed, to determine whether additional patterns need to be extracted through the training phase, or in the event that the evaluation of the accuracy of the classification proves to be sufficient, the method may pursue with classifying new raw data and/or reporting the classification of the measured indicators of the test data set along with the corresponding pattern to provide an intelligible diagnosis or prognosis of a change of state of the device, which resulted or will result in a fault of the device.

Figure 13:
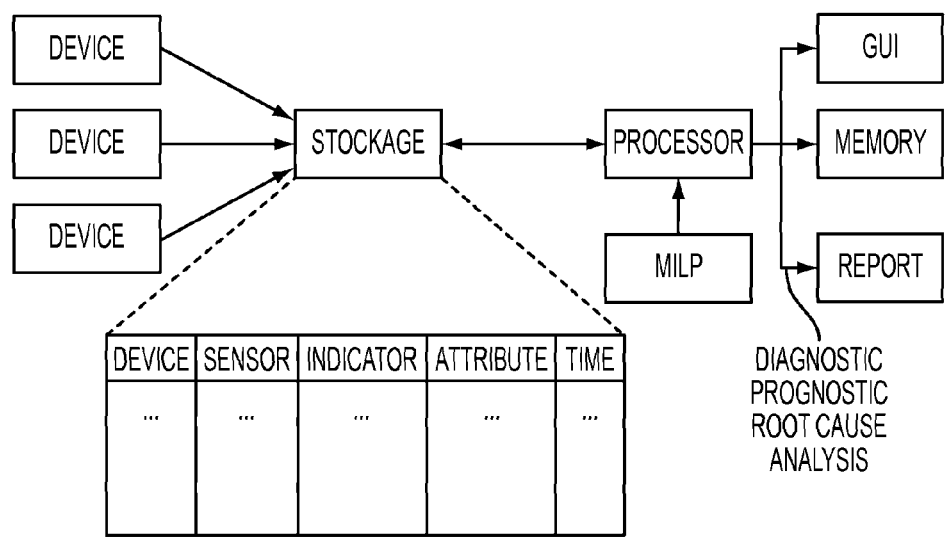
FIG. 13 is a schematic representation of the present tool.

Reference is now made to FIG. 13, which is a schematic representation of a tool in accordance with an aspect. The tool may be composed of hardware, software or a combination thereof. The software may be provided on a disk as a computer-medium to be installed on a computer, on a USB key, on any suitable electronic device or downloadable.

The tool receives measured indicators for one or several devices, and stores the measured indicators in a database (labeled as stockage on FIG. 13). The database may store the measured indicators in various ways, and the measured indicators may comprise one or several information such as for example a timestamp, identification of the device, information on a sensor making the measurements, one or several indicator(s), one or several attribute(s), etc.

The stored measured indicators are then binarized prior to be used either in the training phase or the test phase. The binarization may be performed by a separate binarization module, or by the processor. A separate machine learning data mining module is also provided. The machine learning data mining module, a LAD algorithm, may alternately consist of software adapted to be executed by the processor. The tool further includes a Mixed Integer Linear Programming (MILP) adapted to be executed by the processor and used by the LAD algorithm. The tool further comprises one or several of the following: a graphical user interface, a memory for storing results and a reporting module. The processor is adapted for extracting the measured indicators from the database, binarizing the measured indicators, analyzing the measured indicators by performing the training phase of the LAD algorithm, using Mixed Integer Linear Programming to classify the extracted patterns and the training data set, for performing the test phase of the LAD algorithm, for applying a discriminate function, and for identifying and reporting an intelligible diagnosis or prognosis for the device based on the measured indicators and the corresponding patterns and resulting discriminate function.

The various components depicted on FIG. 13 are for exemplary purposes, and the present tool could be implemented in various alternate ways.

It should be noted that the various components and features of the present tool and method described above can be combined in a variety of ways so as to provide other non-illustrated embodiments within the scope of the appended claims.

It is to be understood that the present tool and method are not limited in their application to the details of construction and parts illustrated in the accompanying drawings and described hereinabove. The present tool and method are capable of other embodiments and of being practiced in various ways. It is also to be understood that the phraseology or terminology used herein is for the purpose of description and not limitation. Hence, although the present tool and method have been described hereinabove by way of embodiments thereof, they can be modified, without departing from the spirit, scope and nature of the appended claims.

What is claimed is:

1. A method for performing dynamic fault detection of a device, the method comprising:
    storing in a database a plurality of measured indicators representative of at least one dynamic condition of the device;
    binarizing by a processor the plurality of measured indicators; and
    performing several iterations for analyzing iteratively the plurality of binarized measured indicators using a machine learning data tool for extracting at least one pattern from the binarized measured indicators by adding at least one different constraint to each iteration, the pattern being indicative of whether the device has a fault or not.

2. The method of claim 1, wherein the measured indicators consist of one or several of the following: a value, type of value, a component, a location, a date, time, and identification of a corresponding sensor.

3. The method of claim 2, wherein the type of value consists of any of the following: pressure, temperature, amplitude, torque, revolution per minute, tension, wattage, humidity level, density, chemical content, nominal value and discrete value.

4. The method of claim 1, further computing a diagnostic or a prognostic based on the at least one extracted pattern.

5. The method of claim 1, wherein the machine learning data tool comprises a Logical Analysis Data (LAD) algorithm.

6. The method of claim 5, wherein the LAD algorithm performs classification by means of a Mixed Integer Linear Programming (MILP) module.

7. The method of claim 1, further comprising computing a discriminate function using the at least one extracted pattern to detect at least one fault of the device.

\* \* \* \* \*